United States Patent
Arai

(10) Patent No.: US 8,466,993 B2
(45) Date of Patent: Jun. 18, 2013

(54) IMAGE SENSING USING SOLID-STATE IMAGE SENSING ELEMENTS

(75) Inventor: Kimitaka Arai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 147 days.

(21) Appl. No.: 13/153,314

(22) Filed: Jun. 3, 2011

(65) Prior Publication Data

US 2011/0234844 A1 Sep. 29, 2011

Related U.S. Application Data

(63) Continuation of application No. PCT/JP2011/000128, filed on Jan. 13, 2011.

(30) Foreign Application Priority Data

Jan. 20, 2010 (JP) .................................. 2010-010366
Dec. 24, 2010 (JP) .................................. 2010-288556

(51) Int. Cl.
*H04N 3/14* (2006.01)
*H04N 5/335* (2011.01)
*H04N 9/04* (2006.01)

(52) U.S. Cl.
USPC ......................................................... 348/280

(58) Field of Classification Search
USPC ......................................... 348/272, 273, 280
See application file for complete search history.

(56) References Cited

U.S. PATENT DOCUMENTS

| | | | |
|---|---|---|---|
| 6,211,915 B1 * | 4/2001 | Harada | 348/298 |
| 7,116,338 B2 | 10/2006 | Fukao et al. | 345/593 |
| 7,623,138 B2 | 11/2009 | Fukao et al. | 345/597 |
| 7,986,360 B2 * | 7/2011 | Mitsunaga et al. | 348/273 |
| 8,031,235 B2 * | 10/2011 | Wada | 348/222.1 |
| 8,300,131 B2 * | 10/2012 | Kawai et al. | 348/311 |
| 2004/0046883 A1 * | 3/2004 | Suzuki | 348/315 |
| 2004/0201760 A1 * | 10/2004 | Ota et al. | 348/272 |
| 2004/0262493 A1 * | 12/2004 | Suzuki | 250/208.1 |
| 2006/0109357 A1 * | 5/2006 | Oda | 348/272 |
| 2007/0206110 A1 | 9/2007 | Wada | 348/340 |
| 2008/0218598 A1 * | 9/2008 | Harada et al. | 348/222.1 |
| 2009/0059051 A1 * | 3/2009 | Sakamoto | 348/311 |
| 2010/0080458 A1 * | 4/2010 | Yamada et al. | 382/167 |

FOREIGN PATENT DOCUMENTS

| | | |
|---|---|---|
| JP | 11-275373 | 10/1999 |
| JP | 2003-230158 | 8/2003 |
| JP | 2004-336469 | 11/2004 |
| JP | 2006-253876 | 9/2006 |
| JP | 2007-258686 | 10/2007 |

* cited by examiner

*Primary Examiner* — Albert Cutler
(74) *Attorney, Agent, or Firm* — Fitzpatrick, Cella, Harper & Scinto

(57) ABSTRACT

This invention makes it possible to provide a technique for suppressing a decrease in resolution of a sensed image even when an image sensor on which solid-state image sensing elements with different sensitivities are arranged is used. A demosaic unit obtains a color component of a given pixel, sensed at the first sensitivity, by performing interpolation calculation using color components of pixels each of which is adjacent to the given pixel and is sensed at the first sensitivity. The demosaic unit also obtains a color component of a given pixel, sensed at the second sensitivity, by performing interpolation calculation using color components of pixels each of which is adjacent to the given pixel and is sensed at the second sensitivity.

7 Claims, 15 Drawing Sheets

FIG. 2

| DG | LR | DG | LB | DG | LR | DG | LB |
|----|----|----|----|----|----|----|----|
| LG | DR | LG | DB | LG | DR | LG | DB |
| DG | LB | DG | LR | DG | LB | DG | LR |
| LG | DB | LG | DR | LG | DB | LG | DR |
| DG | LR | DG | LB | DG | LR | DG | LB |
| LG | DR | LG | DB | LG | DR | LG | DB |
| DG | LB | DG | LR | DG | LB | DG | LR |
| LG | DB | LG | DR | LG | DB | LG | DR |

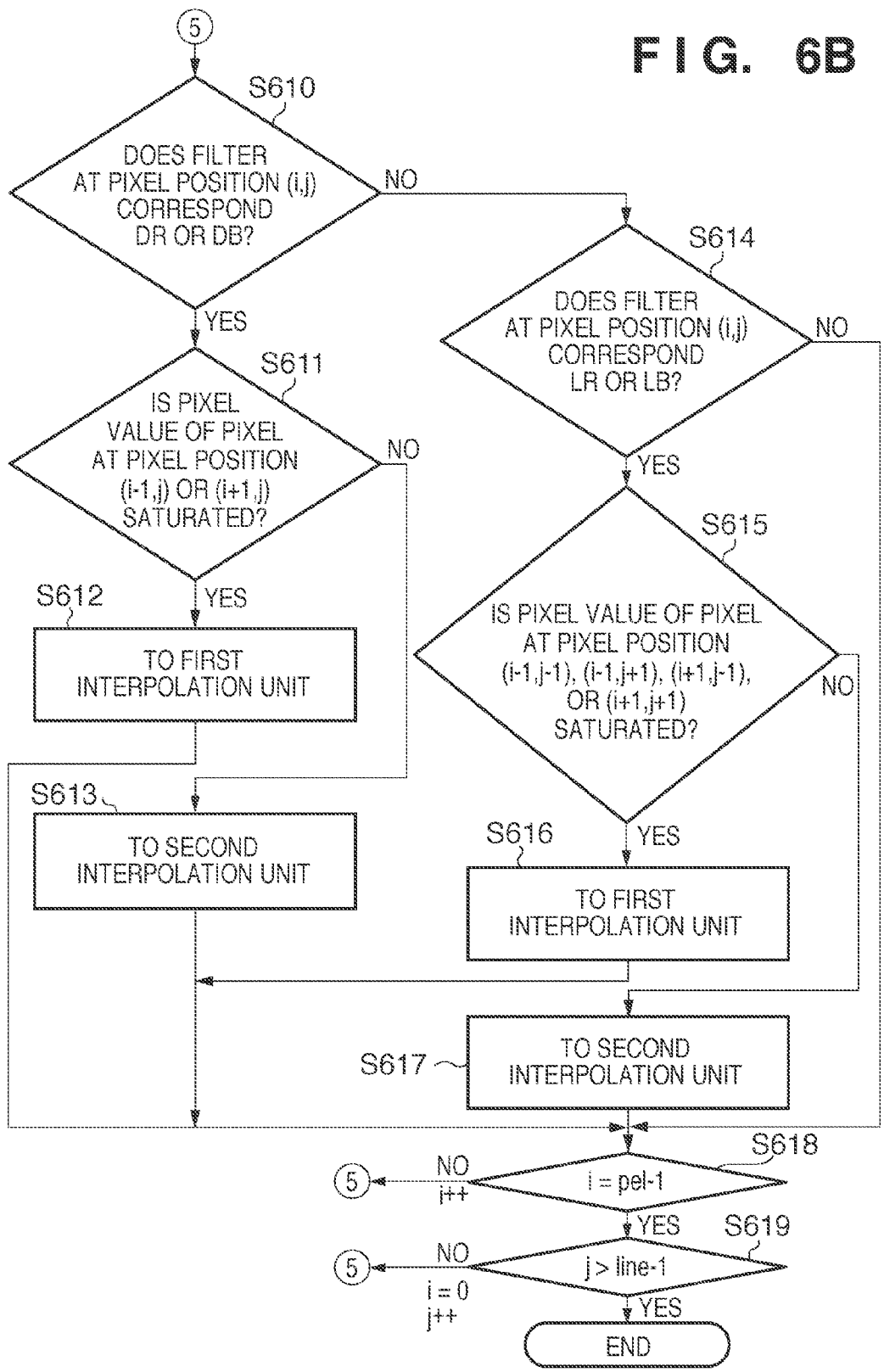

FIG. 9

| DG | DR | DG | LR | DG | DR | DG | LR |
|----|----|----|----|----|----|----|----|
| DB | LG | LB | LG | DB | LG | LB | LG |
| DG | LR | DG | DR | DG | LR | DG | DR |
| LB | LG | DB | LG | LB | LG | DB | LG |
| DG | DR | DG | LR | DG | DR | DG | LR |
| DB | LG | LB | LG | DB | LG | LB | LG |
| DG | LR | DG | DR | DG | LR | DG | DR |
| LB | LG | DB | LG | LB | LG | DB | LG |

IMAGE SENSING USING SOLID-STATE IMAGE SENSING ELEMENTS

This application is a continuation of International Application No. PCT/JP2011/000128, filed on Jan. 13, 2011, which claims the benefit of Japanese Patent Application No. 2010-010366, filed Jan. 20, 2010, and Japanese Patent Application No. 2010-288556, filed Dec. 24, 2010. The contents of the aforementioned applications are incorporated herein by reference in their entirety.

TECHNICAL FIELD

The present invention relates to a single-plate HDR image sensing technique.

BACKGROUND ART

The dynamic range can be widened by imparting different sensitivities to adjacent pixels and synthesizing a signal of a high-sensitivity pixel and a signal of a low-sensitivity pixel. For example, PTL1 discloses a color filter array in which all colors: light R, G, B, and W and dark r, g, b, and w are arranged on all rows and columns. Also, PTL2 discloses a sensor on which RGB rows and W rows are alternately arranged.

However, in the technique disclosed in PTL1, all pixels are provided at the same ratio, so the sampling interval of G (Green), for example, is every two pixels. Thus, only a resolution becomes half that of a normal Bayer array. Also, when G of a high-sensitivity pixel is saturated, the sampling interval of G becomes every four pixels. Thus, a resolution becomes one quarter of that of the Bayer array.

In the technique disclosed in PTL2, only luminance information is used for a low-sensitivity pixel, so color information cannot be held for a high-luminance portion. Also, the resolution in the vertical direction halves.

Citation List
Patent Literature
PTL1: Japanese Patent Laid-Open No. 2006-253876
PTL2: Japanese Patent Laid-Open No. 2007-258686

SUMMARY OF INVENTION

Technical Problem

As described above, when pixels with different sensitivities are arranged on the same sensor, the resolution inevitably decreases. Also, when a high-sensitivity pixel is saturated, the resolution further decreases.

The present invention has been made in consideration of the above-mentioned problem, and has as its object to provide a technique for suppressing a decrease in resolution of a sensed image even when an image sensor on which solid-state image sensing elements with different sensitivities are arranged is used.

Solution to Problem

In order to achieve the object of the present invention, an image sensing apparatus according to the present invention has, for example, the following arrangement. That is, there is provided an image sensing apparatus including an image sensor on which solid-state image sensing elements which sense color components at a first sensitivity and solid-state image sensing elements which sense color components at a second sensitivity higher than the first sensitivity are alternately, two-dimensionally arranged, comprising a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor, a second calculation unit that obtains a color component of a given pixel, sensed at the second sensitivity, by performing interpolation calculation using color components of pixels each of which is adjacent to the given pixel and is sensed at the second sensitivity, in the color image output from the image sensor, and a unit that outputs the color image in which color components of all pixels are determined by the first calculation unit and the second calculation unit.

Advantageous Effects of Invention

With the arrangement according to the present invention, it is possible to suppress a decrease in resolution of a sensed image even when an image sensor on which solid-state image sensing elements with different sensitivities are arranged is used.

Other features and advantages of the present invention will be apparent from the following descriptions taken in conjunction with the accompanying drawings. Noted that the same reference characters denote the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a view illustrating an example of the arrangement of solid-state image sensing elements on an image sensor 103;

FIG. 6B is a flowchart of the processing for obtaining the DG value of each pixel;

FIG. 9 is a view illustrating an example of the arrangement of solid-state image sensing elements on an image sensor 103;

DESCRIPTION OF EMBODIMENTS

Preferred embodiments of the present invention will be described below with reference to the accompanying drawings. Note that the embodiments to be described hereinafter merely exemplify a case in which the present invention is actually practiced, and are practical embodiments of the arrangement defined in claims.

[First Embodiment]

Figure 1:
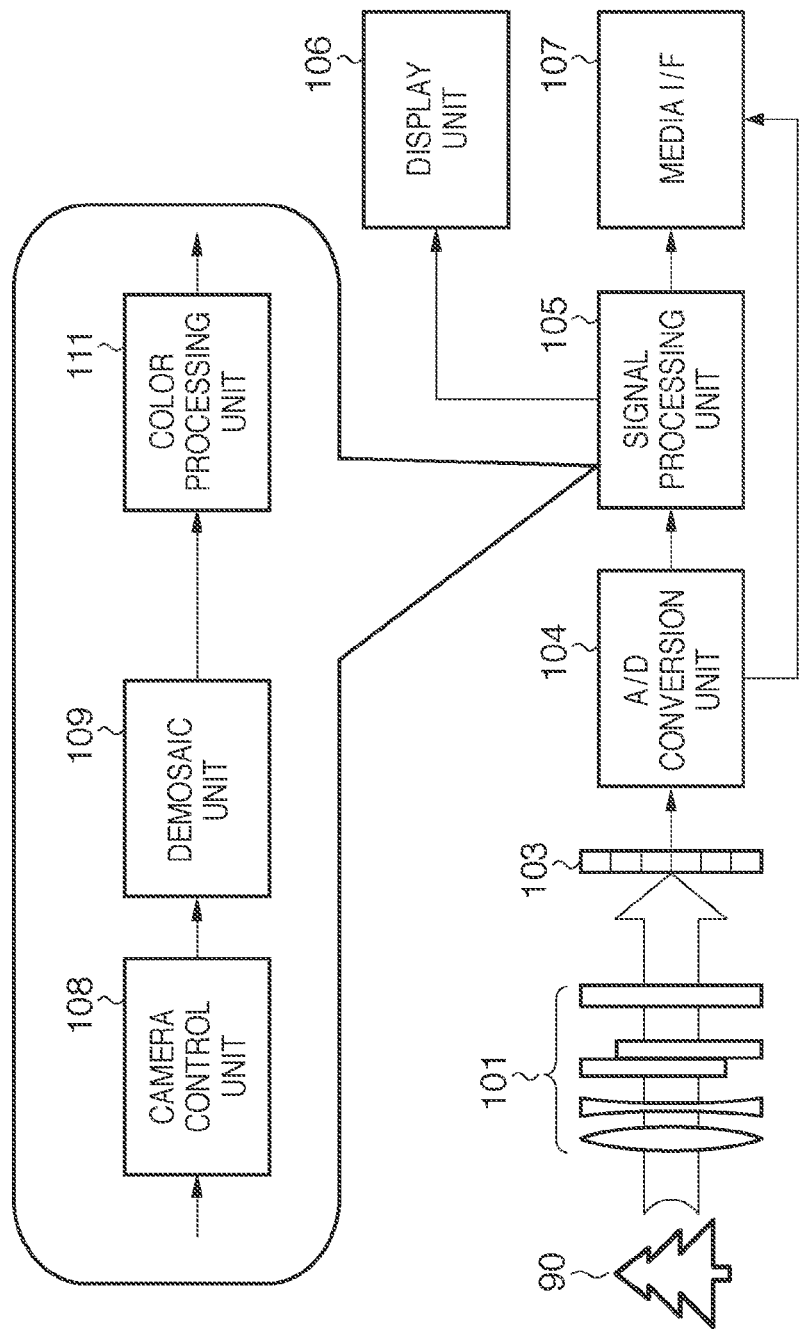
FIG. 1 is a block diagram illustrating an example of the functional configuration of an image sensing apparatus according to the first embodiment.

An example of the functional configuration of an image sensing apparatus according to this embodiment will be described first with reference to a block diagram shown in FIG. 1. Because light in the external world in which an object 90 is present enters an image sensor 103 via an optical system 101, the image sensor 103 accumulates charges corresponding to the light incident on it. The image sensor 103 outputs an analog image signal corresponding to the accumulated charges to an A/D conversion unit 104 in a subsequent stage.

The A/D conversion unit 104 converts the analog image signal input from the image sensor 103 into a digital image signal, and outputs the converted digital image signal to a signal processing unit 105 and a media I/F 107 in subsequent stages.

The signal processing unit 105 performs various types of image processing (to be described later) for a color image represented by the digital image signal input from the A/D conversion unit 104. The signal processing unit 105 outputs the color image having undergone the various types of image processing to a display unit 106 and the media I/F 107 in subsequent stages.

The image sensor 103 will be described next. As shown in FIG. 2, the image sensor 103 includes solid-state image sensing elements DR, DG, and DB which are two-dimensionally arranged on it. The solid-state image sensing elements DR are used to sense R components at a first sensitivity. The solid-state image sensing elements DG are used to sense G components at the first sensitivity. The solid-state image sensing elements DB are used to sense B components at the first sensitivity. Note that "DR" indicates dark red (red with a first brightness), "DG" indicates dark green (green with the first brightness), and "DB" indicates dark blue (blue with the first brightness). The image sensor 103 also includes solid-state image sensing elements LR, LG, and LB which are two-dimensionally arranged on it. The solid-state image sensing elements LR are used to sense R components at a second sensitivity higher than the first sensitivity. The solid-state image sensing elements LG are used to sense G components at the second sensitivity. The solid-state image sensing elements LB are used to sense B components at the second sensitivity. Note that "LR" indicates light red (red with a second brightness higher than the first brightness), "LG" indicates light green (green with the second brightness), and "LB" indicates light blue (blue with the second brightness).

The layout pattern of these solid-state image sensing elements arranged on the image sensor 103 will be described in more detail herein. As shown in FIG. 2, two-dimensional arrays each including 4×4 solid-state image sensing elements formed from the solid-state image sensing elements DR, DG, DB, LR, LG, and LB are repeatedly arranged on the image sensor 103 without overlapping. In one two-dimensional array of solid-state image sensing elements, the ratio between the numbers of solid-state image sensing elements DR, DG, and DB is 1:2:1. Again in this array, the ratio between the numbers of solid-state image sensing elements LR, LG, and LB is 1:2:1. Moreover, a column of solid-state image sensing elements (or a row of solid-state image sensing elements) formed from the solid-state image sensing elements DG and LG is arranged on the image sensor 103 for every other column (row). The solid-state image sensing elements LR and LB can be interchanged with each other, and the solid-state image sensing elements DR and DB can similarly be interchanged with each other.

In this manner, the image sensing apparatus according to this embodiment includes an image sensor on which solid-state image sensing elements for sensing color components at a first sensitivity and solid-state image sensing elements for sensing color components at a second sensitivity higher than the first sensitivity are alternately, two-dimensionally arranged.

The signal processing unit 105 will be described next. A camera control unit 108 performs AE/AF/AWB control. A demosaic unit 109 generates an HDR image by performing interpolation processing for pixels sensed at the first sensitivity and interpolation processing for pixels sensed at the second sensitivity, in a color image represented by the digital image signal input from the A/D conversion unit 104.

A color processing unit 111 performs various types of color processing such as color balance processing, γ processing, sharpness processing, and noise reduction processing for the HDR image. The color processing unit 111 outputs the HDR image having undergone the various types of color processing to the display unit 106 and media I/F 107 in subsequent stages.

Figure 3A:
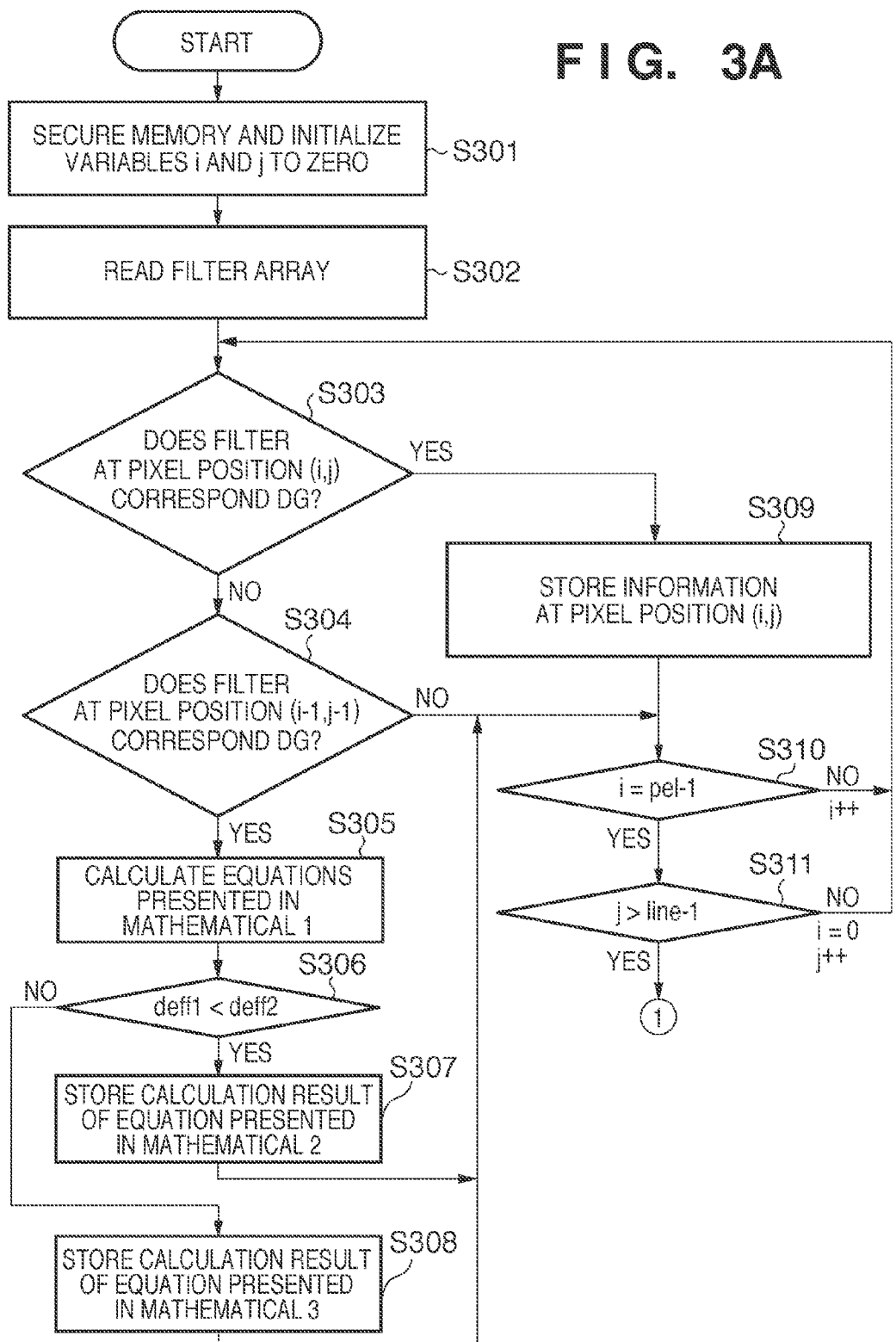
FIG. 3A is a flowchart of processing for obtaining the DG value of each pixel.
Figure 3B:
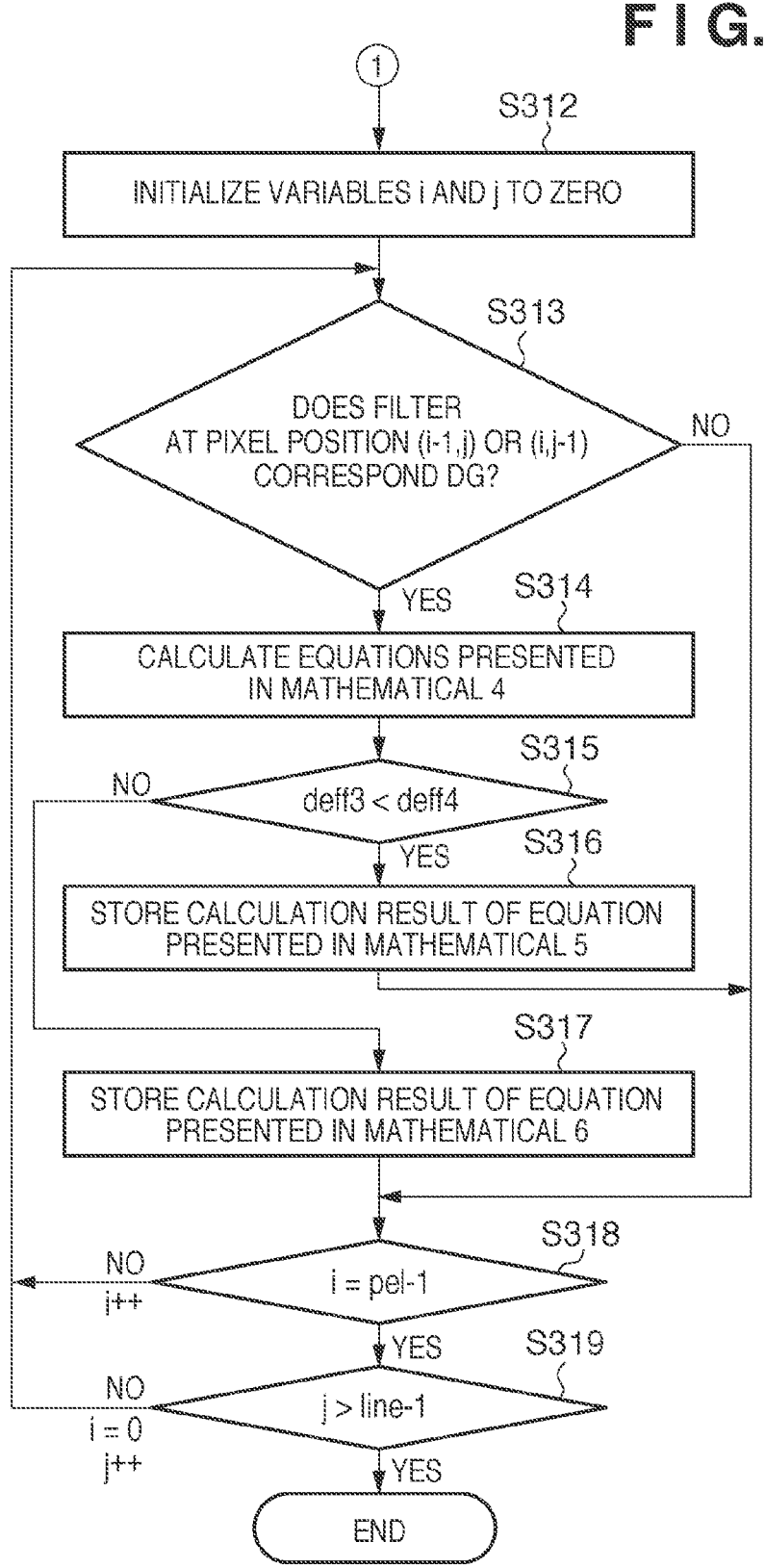
FIG. 3B is a flowchart of the processing for obtaining the DG value of each pixel.

Processing performed by the demosaic unit 109 to obtain the DG value of each pixel in the color image will be described next with reference to FIGS. 3A and 3B showing flowcharts of this processing. Note that processing performed by the demosaic unit 109 to obtain the LG value of each pixel which constitutes the color image is processing in which "DG" is substituted by "LG" in the flowcharts shown in FIGS. 3A and 3B.

In step S301, the demosaic unit 109 secures a memory area, used to perform processing to be described later, in a memory which is provided in itself or managed by it, and initializes both the variables i and j indicating the pixel position in the above-mentioned color image to zero. Note that the variable i indicates the x-coordinate value in the color image, and the variable j indicates the y-coordinate value in the color image. Note also that the position of the upper left corner in the color image is defined as an origin (i,j)=(0,0). The setting of a coordinate system defined in the color image is not limited to this, as a matter of course.

In step S302, the demosaic unit 109 reads out, from the above-mentioned memory, map information (filter array) indicating which of solid-state image sensing elements DR, DG, DB, LR, LG, and LB is placed at each position on the image sensor 103, as shown in FIG. 2.

In step S303, the demosaic unit 109 determines using the map information whether the solid-state image sensing element at the position on the image sensor 103, which corresponds to the pixel position (i,j) in the color image, is the solid-state image sensing element DG. This amounts to determining whether the pixel at the pixel position (i,j) in the color image is sensed by the solid-state image sensing element DG. This determination can be done in accordance with whether the solid-state image sensing element at the position (i,j) on the image sensor 103 is the solid-state image sensing element DG, upon defining the position of the upper left corner on the image sensor 103 as an origin.

If it is determined in step S303 that the solid-state image sensing element corresponding to the pixel position (i,j) is the solid-state image sensing element DG, the process advances to step S309; otherwise, the process advances to step S304.

In step S304, the demosaic unit 109 determines using the map information whether the solid-state image sensing element at the position on the image sensor 103, which corresponds to the pixel position (i−1,j−1) in the color image, is the solid-state image sensing element DG. This determination is done in the same way as in step S303.

If it is determined in step S304 that the solid-state image sensing element corresponding to the pixel position (i−1,j−1) is the solid-state image sensing element DG, the process advances to step S305; otherwise, the process advances to step S310.

In step S305, the demosaic unit 109 calculates equations presented in mathematical 1. This yields a variation evaluation value deff1 for five pixels juxtaposed from the upper left to the lower right with the pixel at the pixel position (i,j) as the center, and a variation evaluation value deff2 for five pixels juxtaposed from the upper right to the lower left with the pixel at the pixel position (i,j) as the center. Note that P(i,j) indicates the pixel value at the pixel position (i,j) in the color image.

$$deff1=|2\times P(i,j)-P(i-2,j-2)-P(i+2,j+2)|+|P(i-1,j-1)-P(i+1,j+1)|$$

$$deff2=|2\times P(i,j)-P(i-2,j+2)-P(i+2,j-2)|+|P(i-1,j+1)-P(i+1,j-1)|$$ [Mathematical 1]

In step S306, the demosaic unit 109 compares the variation evaluation values deff1 and deff2. If the comparison result shows deff1<deff2, the process advances to step S307; or if this comparison result shows deff1≧deff2, the process advances to step S308.

In step S307, the demosaic unit 109 performs interpolation calculation using the pixel values of pixels adjacent to the pixel at the pixel position (i,j) to obtain DG(i,j) indicating the DG value of the pixel at the pixel position (i,j) in accordance with an equation presented in mathematical 2.

$$DG(i,j)=|(2\times P(i,j)-P(i-2,j-2)-P(i+2,j+2))\div 4|+(P(i-1,j-1)+P(i+1,j+1))\div 2$$ [Mathematical 2]

This interpolation processing means one-dimensional low-pass filter processing, and the coefficient value for each pixel value in the equation presented in mathematical 2 corresponds to a filter coefficient. On the other hand, in step S308, the demosaic unit 109 performs interpolation calculation using the pixel values of pixels adjacent to the pixel at the pixel position (i,j) to obtain DG(i,j) indicating the DG value of the pixel at the pixel position (i,j) in accordance with an equation presented in mathematical 3.

$$DG(i,j)=|(2\times P(i,j)-P(i-2,j+2)-P(i+2,j-2))\div 4|+(P(i-1,j+1)+P(i+1,j-1))\div 2$$ [Mathematical 3]

In step S309, the demosaic unit 109 substitutes the pixel value P(i,j) for DG(i,j). In step S310, the demosaic unit 109 determines whether the value of the variable i is equal to "pel" (the total number of pixels in the x direction in the color image)−1. If it is determined that i=pel−1, the process advances to step S311; or if it is determined that i≠pel−1, the value of the variable i is incremented by one and the processes in step S303 and subsequent steps are repeated.

In step S311, the demosaic unit 109 determines whether the value of the variable j is larger than "line" (the total number of pixels in the y direction in the color image)−1. If it is determined in step S311 that j>line−1, the process advances to step S312; or if it is determined in step S311 that j≦line−1, the value of the variable i is initialized to zero, the value of the variable j is incremented by one, and the processes in step S303 and subsequent steps are repeated.

In step S312, the demosaic unit 109 initializes both the variables i and j to zero. In step S313, the demosaic unit 109 determines using the map information whether the solid-state image sensing element at the position on the image sensor 103, which corresponds to the pixel position (i−1,j) or (i,j−1) in the color image, is the solid-state image sensing element DG. This determination is done in the same way as in step S303.

If it is determined in step S313 that the solid-state image sensing element corresponding to the pixel position (i−1,j) or (i,j−1) is the solid-state image sensing element DG, the process advances to step S314; otherwise, the process advances to step S318.

In step S314, the demosaic unit 109 calculates equations presented in mathematical 4 to obtain a variation evaluation value deff3 for pixels which are adjacent to a pixel Q at the pixel position (i,j) vertically (in the y direction), and a variation evaluation value deff4 for pixels which are adjacent to the pixel Q horizontally (in the x direction).

$$deff3=|P(i,j-1)-P(i,j+1)|$$

$$deff4=|P(i-1,j)-P(i+1,j)|$$ [Mathematical 4]

In step S315, the demosaic unit 109 compares the variation evaluation values deff3 and deff4. If the comparison result shows deff3<deff4, the process advances to step S316; or if this comparison result shows deff3≧deff4, the process advances to step S317.

In step S316, the demosaic unit 109 performs interpolation calculation using the pixel values of pixels adjacent to the pixel at the pixel position (i,j) to obtain DG(i,j) indicating the DG value of the pixel at the pixel position (i,j) in accordance with an equation presented in mathematical 5.

$$DG(i,j)=(P(i,j-1)+P(i,j+1))\div 2$$ [Mathematical 5]

On the other hand, in step S317, the demosaic unit 109 performs interpolation calculation using the pixel values of pixels adjacent to the pixel at the pixel position (i,j) to obtain DG(i,j) indicating the DG value of the pixel at the pixel position (i,j) in accordance with an equation presented in mathematical 6.

$$DG(i,j)=(P(i-1,j)+P(i+1,j))\div 2$$ [Mathematical 6]

In step S318, the demosaic unit 109 determines whether the value of the variable i is equal to pel−1. If it is determined in step S318 that i=pel−1, the process advances to step S319; or if it is determined in step S318 that i≠pel−1, the value of the variable i is incremented by one and the processes in step S313 and subsequent steps are repeated.

Figure 4A:
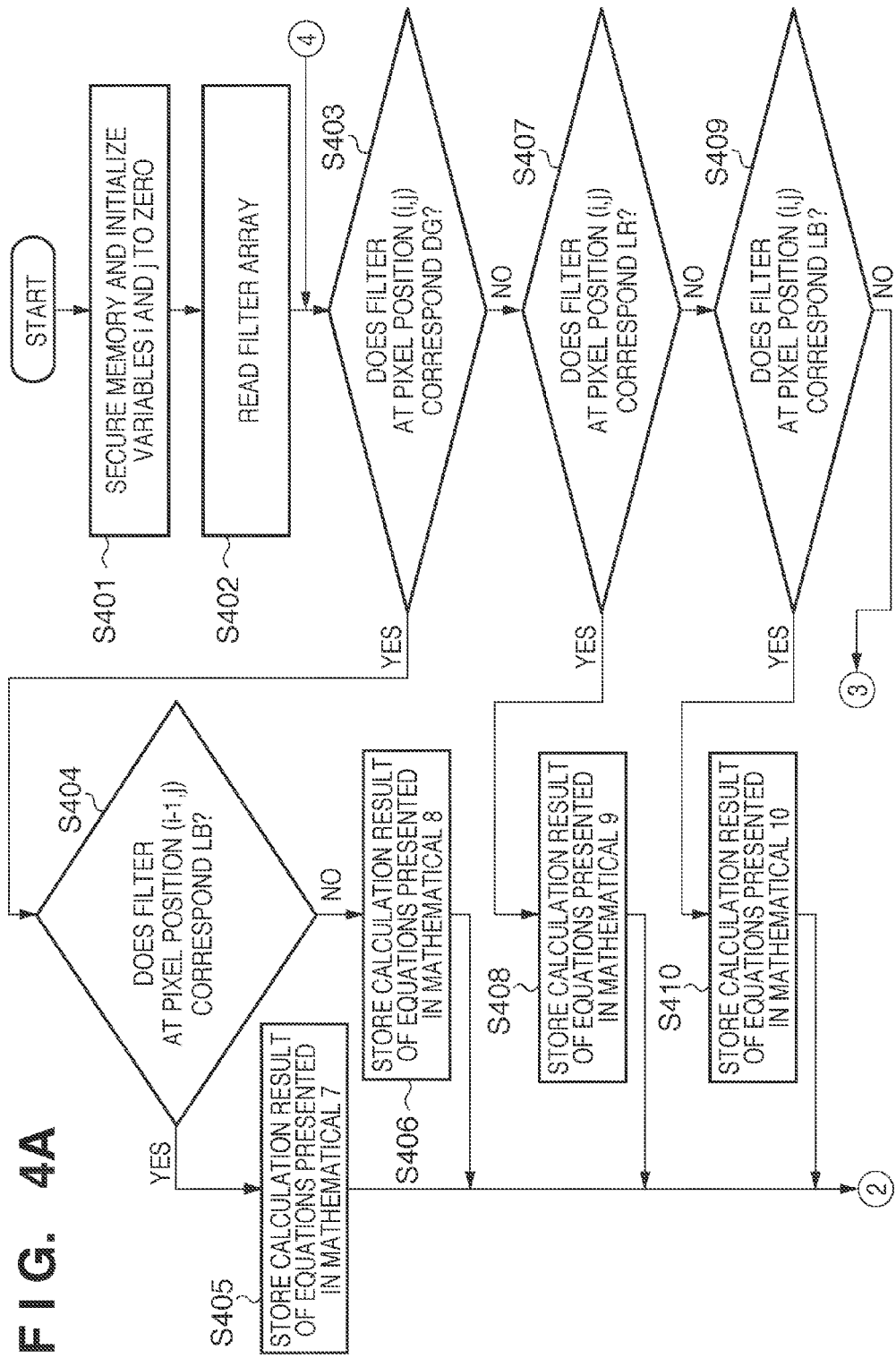
FIG. 4A is a flowchart of processing for obtaining the DR and RB values of each pixel.
Figure 4B:
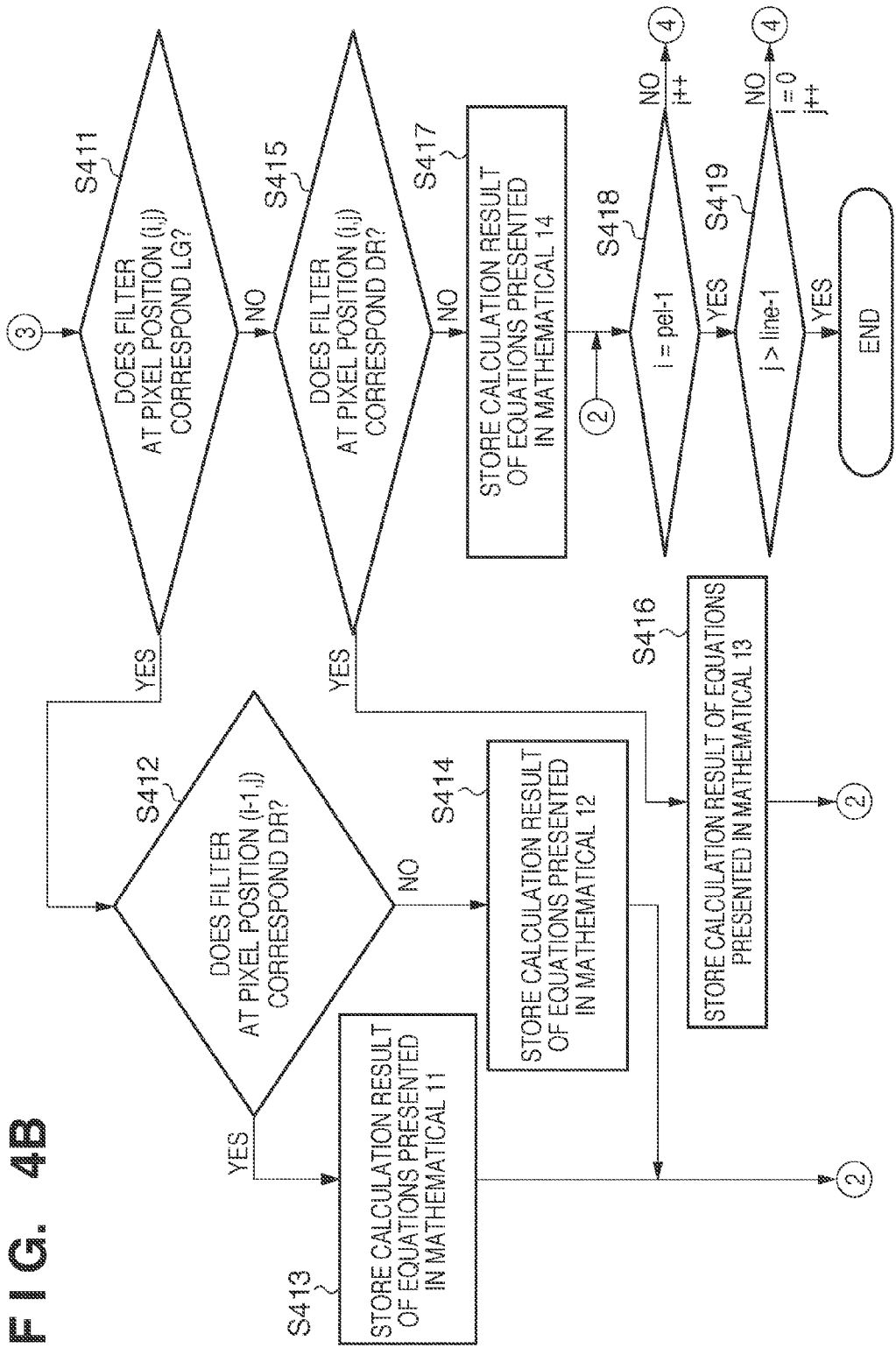
FIG. 4B is a flowchart of the processing for obtaining the DR and RB values of each pixel.

In step S319, the demosaic unit 109 determines whether the value of the variable j is larger than line−1. If it is determined in step S319 that j>line−1, the process ends and a shift to processing according to flowcharts shown in FIGS. 4A and 4B is made. On the other hand, if it is determined in step S319 that j≦line−1, the value of the variable i is initialized to zero, the value of the variable j is incremented by one, and the processes in step S313 and subsequent steps are repeated.

Processing performed by the demosaic unit 109 to obtain the DR and RB values of each pixel which constitutes the color image will be described next with reference to FIGS. 4A and 4B showing flowcharts of this processing. Note that processing performed by the demosaic unit 109 to obtain the LR and LB values of each pixel which constitutes the color image is processing in which "DR" is substituted by "LR" and "DB" is substituted by "LB" in the flowcharts shown in FIGS. 4A and 4B. Note also that the processing according to the flowcharts shown in FIGS. 4A and 4B follows the processing (the processing for DG and LG) according to the flowcharts shown in FIGS. 3A and 3B.

First, in step S401, the demosaic unit 109 secures a memory area, used to perform processing to be described later, in a memory which is provided in itself or managed by it, and initializes both the variables i and j indicating the pixel position in the above-mentioned color image to zero.

In step S402, the demosaic unit 109 reads out, from the above-mentioned memory, map information (filter array) indicating which of solid-state image sensing elements DR, DG, DB, LR, LG, and LB is placed at each position on the image sensor 103, as shown in FIG. 2.

In step S403, the demosaic unit 109 determines using the map information whether the solid-state image sensing element at the position on the image sensor 103, which corresponds to the pixel position (i,j) in the color image, is the solid-state image sensing element DG. This determination is done in the same way as in step S303.

If it is determined in step S403 that the solid-state image sensing element corresponding to the pixel position (i,j) is the solid-state image sensing element DG, the process advances to step S404; otherwise, the process advances to step S407.

In step S404, the demosaic unit 109 determines using the map information whether the solid-state image sensing element at the position on the image sensor 103, which corresponds to the pixel position (i−1,j) in the color image, is the solid-state image sensing element LB. This determination is done in the same way as in step S303.

If it is determined in step S404 that the solid-state image sensing element corresponding to the pixel position (i−1,j) is the solid-state image sensing element LB, the process advances to step S405; otherwise, the process advances to step S406.

In step S405, the demosaic unit 109 performs interpolation calculation using equations presented in mathematical 7. This yields DR(i,j) indicating the DR value of the pixel at the pixel position (i,j), DB(i,j) indicating the DB value of this pixel, LR(i,j) indicating the LR value of this pixel, and LB(i,j) indicating the LB value of this pixel.

$$DR(i,j)=(DR(i-1,j-1)-DG(i-1,j-1)+DR(i+1,j+1)-DG(i+1,j+1))\div 2$$

$$DB(i,j)=(DB(i-1,j+1)-DG(i-1,j+1)+DB(i+1,j-1)-DG(i+1,j-1))\div 2$$

$$LR(i,j)=(LR(i+1,j)-LG(i+1,j))\div 2+(LR(i-1,j+2)-LG(i-1,j+2)+LR(i-1,j-2)-LG(i-1,j-2))\div 4$$

$$LB(i,j)=(LB(i-1,j)-LG(i-1,j))\div 2+(LB(i+1,j+2)-LG(i+1,j+2)+LB(i+1,j-2)-LG(i+1,j-2))\div 4 \quad \text{[Mathematical 7]}$$

In step S406, the demosaic unit 109 performs interpolation calculation using equations presented in mathematical 8. This yields DR(i,j), DB(i,j), LR(i,j), and LB(i,j) of the pixel at the pixel position (i,j).

$$DR(i,j)=(DR(i-1,j+1)-DG(i-1,j+1)+DR(i+1,j+1)-DG(i+1,j+1))\div 2$$

$$DB(i,j)=(DB(i-1,j-1)-DG(i-1,j-1)+DB(i+1,j+1)-DG(i+1,j+1))\div 2$$

$$LR(i,j)=(LR(i-1,j)-LG(i-1,j))\div 2+(LR(i+1,j+2)-LG(i+1,j+2)+LR(i+1,j-2)-LG(i+1,j-2))\div 4$$

$$LB(i,j)=(LB(i+1,j)-LG(i+1,j))\div 2+(LB(i-1,j+2)-LG(i-1,j+2)+LB(i-1,j-2)-LG(i-1,j-2))\div 4 \quad \text{[Mathematical 8]}$$

In step S407, the demosaic unit 109 determines using the map information whether the solid-state image sensing element at the position on the image sensor 103, which corresponds to the pixel position (i,j) in the color image, is the solid-state image sensing element LR. This determination is done in the same way as in step S303.

If it is determined in step S407 that the solid-state image sensing element corresponding to the pixel position (i,j) is the solid-state image sensing element LR, the process advances to step S408; otherwise, the process advances to step S409.

In step S408, the demosaic unit 109 performs interpolation calculation using equations presented in mathematical 9. This yields DR(i,j), DB(i,j), LR(i,j), and LB(i,j) of the pixel at the pixel position (i,j).

$$DR(i,j)=(DR(i,j+1)-DG(i,j+1))\div 2+(DR(i-2,j-1)-DG(i-2,j-1)+DR(i+2,j-1)-DG(i+2,j-1))\div 4$$

$$DB(i,j)=(DB(i,j-1)-DG(i,j-1))\div 2+(DB(i-2,j+1)-DG(i-2,j+1)+DB(i+2,j+1)-DG(i+2,j+1))\div 4$$

$$LR(i,j)=LR(i,j)$$

$$LB(i,j)=(LB(i-2,j)-LG(i-2,j))\div 4+(LB(i+2,j)-LG(i+2,j))\div 4+(LB(i,j-2)-LR(i,j-2))\div 4+(LB(i,j+2)-LG(i,j+2))\div 4 \quad \text{[Mathematical 9]}$$

In step S409, the demosaic unit 109 determines using the map information whether the solid-state image sensing element at the position on the image sensor 103, which corresponds to the pixel position (i,j) in the color image, is the solid-state image sensing element LB. This determination is done in the same way as in step S303.

If it is determined in step S409 that the solid-state image sensing element corresponding to the pixel position (i,j) is the solid-state image sensing element LB, the process advances to step S410; otherwise, the process advances to step S411.

In step S410, the demosaic unit 109 performs interpolation calculation using equations presented in mathematical 10. This yields DR(i,j), DB(i,j), LR(i,j), and LB(i,j) of the pixel at the pixel position (i,j).

$$DR(i,j)=(DR(i,j-1)-DG(i,j-1))\div 2+(DR(i-2,j+1)-DG(i-2,j+1)+DR(i+2,j+1)-DG(i+2,j+1))\div 4$$

$$DB(i,j)=(DB(i,j+1)-DG(i,j+1))\div 2+(DB(i-2,j-1)-DG(i-2,j-1)+DB(i+2,j-1)-DG(i+2,j-1))\div 4$$

$$LR(i,j)=(LR(i-2,j)-LG(i-2,j))\div 4+(LR(i+2,j)-LG(i+2,j))\div 4+(LR(i,j-2)-LR(i,j-2))\div 4+(LR(i,j+2)-LG(i,j+2))\div 4$$

$$LB(i,j)=LB(i,j) \quad \text{[Mathematical 10]}$$

In step S411, the demosaic unit 109 determines using the map information whether the solid-state image sensing element at the position on the image sensor 103, which corresponds to the pixel position (i,j) in the color image, is the solid-state image sensing element LG. This determination is done in the same way as in step S303.

If it is determined in step S411 that the solid-state image sensing element corresponding to the pixel position (i,j) is the solid-state image sensing element LG, the process advances to step S412; otherwise, the process advances to step S415.

In step S412, the demosaic unit 109 determines using the map information whether the solid-state image sensing element at the position on the image sensor 103, which corresponds to the pixel position (i−1,j) in the color image, is the solid-state image sensing element DR. This determination is done in the same way as in step S303.

If it is determined in step S412 that the solid-state image sensing element corresponding to the pixel position (i−1,j) is the solid-state image sensing element DR, the process advances to step S413; otherwise, the process advances to step S414.

In step S413, the demosaic unit 109 performs interpolation calculation using equations presented in mathematical 11. This yields DR(i,j), DB(i,j), LR(i,j), and LB(i,j) of the pixel at the pixel position (i,j).

$$DR(i,j)=(DR(i-1,j)-DG(i-1,j))\div 2+(DR(i+1,j+2)-DG(i+1,j+2)+DR(i+1,j-2)-DG(i+1,j-2))\div 4$$

$$DB(i,j)=(DB(i+1,j)-DG(i+1,j))\div 2+(DB(i-1,j+2)-DG(i-1,j+2)+DB(i-1,j-2)-DG(i-1,j-2))\div 4$$

$$LR(i,j)=(LR(i-1,j+1)-LG(i-1,j+1)+LR(i-1,j+1)-LG(i-1,j+1))\div 2$$

$$LB(i,j)=(LB(i-1,j-1)-LG(i-1,j-1)+LB(i+1,j+1)-LG(i+1,j+1))\div 2 \quad \text{[Mathematical 11]}$$

On the other hand, in step S414, the demosaic unit 109 performs interpolation calculation using equations presented in mathematical 12. This yields DR(i,j), DB(i,j), LR(i,j), and LB(i,j) of the pixel at the pixel position (i,j).

$$DR(i,j)=(DR(i+1,j)-DG(i+1,j))\div 2+(DR(i-1,j+2)-DG(i-1,j+2)+DR(i-1,j-2)-DG(i-1,j-2))\div 4$$

$$DB(i,j)=(DB(i-1,j)-DG(i-1,j))\div 2+(DB(i+1,j+2)-DG(i+1,j+2)+DB(i+1,j-2)-DG(i+1,j-2))\div 4$$

$$LR(i,j)=(LR(i-1,j-1)-LG(i-1,j-1)+LR(i+1,j+1)-LG(i+1,j+1))\div 2$$

$$LB(i,j)=(LB(i-1,j+1)-LG(i-1,j+1)+LB(i-1,j+1)-LG(i-1,j+1))\div 2 \quad \text{[Mathematical 12]}$$

In step S415, the demosaic unit 109 determines using the map information whether the solid-state image sensing element at the position on the image sensor 103, which corresponds to the pixel position (i,j) in the color image, is the solid-state image sensing element DR. This determination is done in the same way as in step S303.

If it is determined in step S415 that the solid-state image sensing element corresponding to the pixel position (i,j) is the solid-state image sensing element DR, the process advances to step S416; otherwise, that is, if it is determined in step S415 that the solid-state image sensing element corresponding to the pixel position (i,j) is the solid-state image sensing element DB, the process advances to step S417.

In step S416, the demosaic unit 109 performs interpolation calculation using equations presented in mathematical 13. This yields DR(i,j), DB(i,j), LR(i,j), and LB(i,j) of the pixel at the pixel position (i,j).

$$DR(i,j)=DR(i,j)$$

$$DB(i,j)=(DB(i-2,j)-DG(i-2,j))\div 4+(DB(i+2,j)-DG(i+2,j))\div 4+(DB(i,j-2)-DR(i,j-2))\div 4+(DB(i,j+2)-DG(i,j+2))\div 4$$

$$LR(i,j)=(LR(i,j-1)-LG(i,j-1))\div 2+(LR(i-2,j+1)-LG(i-2,j+1)+LR(i+2,j+1)-LG(i+2,j+1))\div 4$$

$$LB(i,j)=(LB(i,j+1)-LG(i,j+1))\div 2+(LB(i-2,j-1)-LG(i-2,j-1)+LB(i+2,j-1)-LG(i+2,j-1))\div 4 \quad \text{[Mathematical 13]}$$

On the other hand, in step S417, the demosaic unit 109 performs interpolation calculation using equations presented in mathematical 14. This yields DR(i,j), DB(i,j), LR(i,j), and LB(i,j) of the pixel at the pixel position (i,j).

$$DR(i,j)=(DR(i-2,j)-DG(i-2,j))\div 4+(DR(i+2,j)-DG(i+2,j))\div 4+(DR(i,j-2)-DG(i,j-2))\div 4+(DR(i,j+2)-DG(i,j+2))\div 4$$

$$DB(i,j)=DB(i,j)$$

$$LR(i,j)=(LR(i,j+1)-LG(i,j+1))\div 2+(LR(i-2,j-1)-LG(i-2,j-1)+LR(i+2,j-1)-LG(i+2,j-1))\div 4$$

$$LB(i,j)=(LB(i,j-1)-LG(i,j-1))\div 2+(LB(i-2,j+1)-LG(i-2,j+1)+LB(i+2,j+1)-LG(i+2,j+1))\div 4 \quad \text{[Mathematical 14]}$$

In step S418, the demosaic unit 109 determines whether the value of the variable i is equal to pel−1. If it is determined in step S418 that i=pel−1, the process advances to step S419; or if it is determined in step S418 that i≠pel−1, the value of the variable i is incremented by one and the processes in step S403 and subsequent steps are repeated.

In step S419, the demosaic unit 109 determines whether the value of the variable j is larger than line−1. If it is determined in step S419 that j>line−1, the process ends. On the other hand, if it is determined in step S419 that j≦line−1, the value of the variable i is initialized to zero, the value of the variable j is incremented by one, and the processes in step S403 and subsequent steps are repeated.

In this manner, the color components (DR, DG, DB, LR, LG, and LB) for each pixel which constitutes the color image are determined by performing processing according to the flowcharts shown in FIGS. 3A, 3B, 4A, and 4B described above. The feature of this embodiment lies in that this determination processing is realized by the following calculation processing. That is, a color component of a given pixel sensed at the first sensitivity is obtained by interpolation calculation (first calculation) using a color component of a pixel which is adjacent to the given pixel and is sensed at the first sensitivity. A color component of a given pixel sensed at the second sensitivity is obtained by interpolation calculation (second calculation) using a color component of a pixel which is adjacent to the given pixel and is sensed at the second sensitivity.

In this manner, according to this embodiment, even when pixels with different sensitivities are arranged on the same sensor, the resolution of a portion incapable of being sampled can be partially restored by performing interpolation using the correlation between a color filter with a highest resolution and multiple colors. Also, because demosaicing is performed based only on a pixel with one sensitivity, a stable resolution can be obtained regardless of saturation or unsaturation.

[Second Embodiment]

Figure 5:
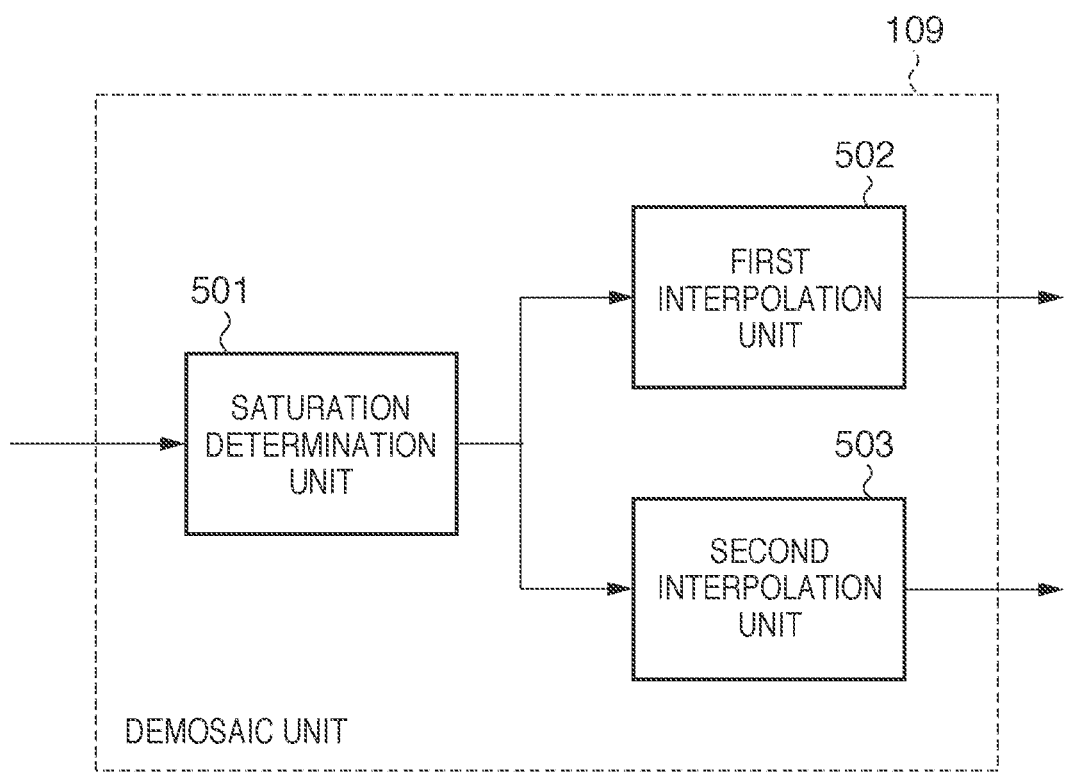
FIG. 5 is a block diagram illustrating an example of the configuration of a demosaic unit 109 according to the second embodiment.

This embodiment is different from the first embodiment only in the configuration and operation of the demosaic unit 109. A demosaic unit 109 according to this embodiment has a configuration as shown in FIG. 5. A saturation determination unit 501 determines, for each pixel which constitutes a color image, whether the pixel value is saturated. A first interpolation unit 502 processes a pixel with a saturated pixel value, and a second interpolation unit 503 processes a pixel with an unsaturated pixel value.

Since the operation of the second interpolation unit 503 is the same as that of the demosaic unit 109, having been described in the first embodiment, only the operation of the first interpolation unit 502 will be mentioned below, and that of the second interpolation unit 503 will not be described. Also, only differences from the first embodiment will be mentioned below, and the second embodiment is the same as the first embodiment except for points to be described hereinafter.

Figure 6A:
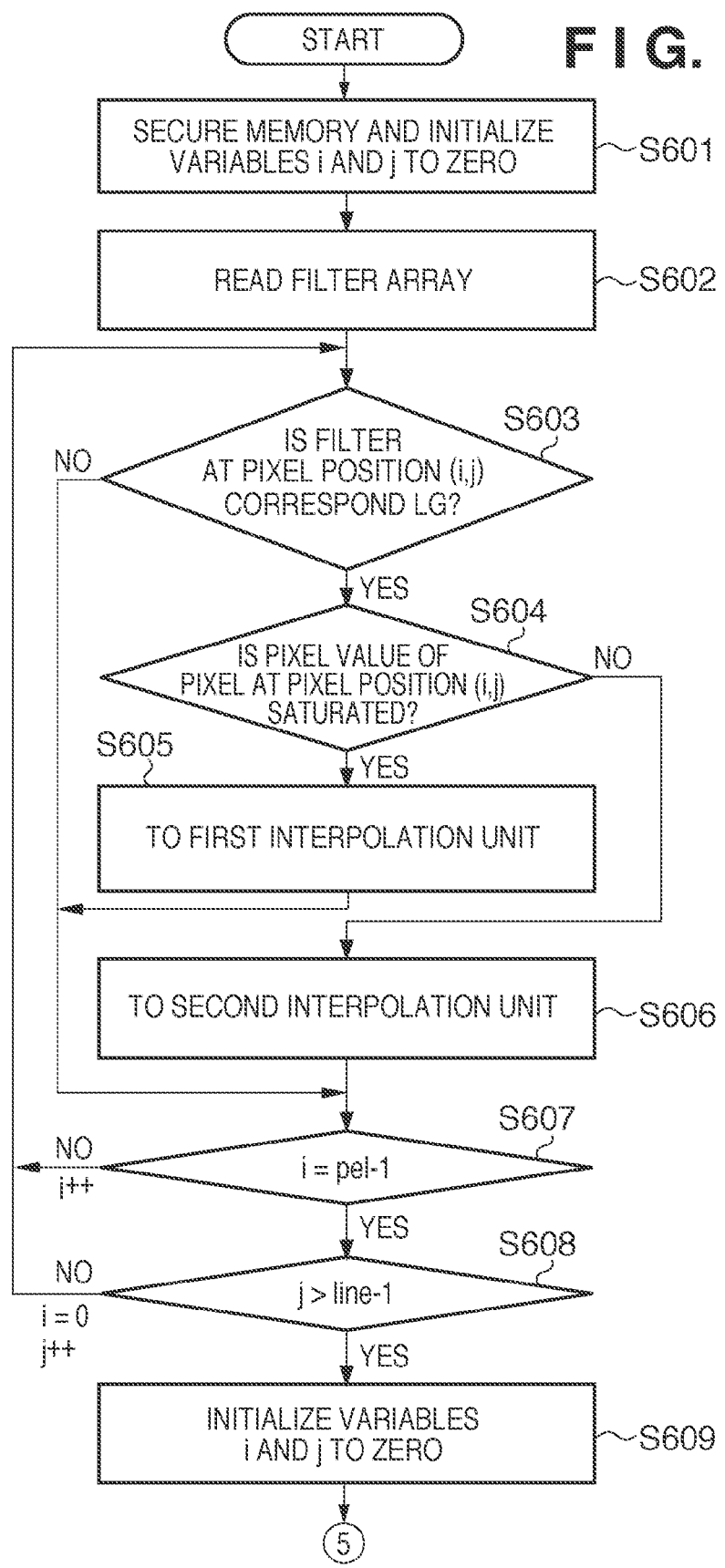
FIG. 6A is a flowchart of processing for obtaining the DG value of each pixel.

Processing with which the demosaic unit 109 according to this embodiment obtains the DG value of each pixel which constitutes a color image will be described with reference to FIGS. 6A and 6B showing flowcharts of this processing. Note that the following description assumes that a pixel value P(i,j) is stored in advance for DG(i,j).

In step S601, the demosaic unit 109 secures a memory area, used to perform processing to be described later, in a memory which is provided in itself or managed by it, and initializes both the variables i and j indicating the pixel position in the above-mentioned color image to zero.

In step S602, the demosaic unit 109 reads out, from the above-mentioned memory, map information (filter array) indicating which of solid-state image sensing elements DR, DG, DB, LR, LG, and LB is placed at each position on an image sensor 103, as shown in FIG. 2.

In step S603, the demosaic unit 109 determines using the map information whether the solid-state image sensing element at the position on the image sensor 103, which corresponds to the pixel position (i,j) in the color image, is the solid-state image sensing element LG. This determination is done in the same way as in step S303.

If it is determined in step S603 that the solid-state image sensing element corresponding to the pixel position (i,j) is the solid-state image sensing element LG, the process advances to step S604; otherwise, the process advances to step S607.

In step S604, the demosaic unit 109 determines whether the pixel value of the pixel at the pixel position (i,j) in the color image is saturated. If it is determined in step S604 that this pixel value is saturated, the process advances to step S605; otherwise, the process advances to step S606. Determination as to whether the pixel value is saturated is done in the following way. That is, if the pixel value is equal to or larger than a predetermined value, it is determined that this pixel value is saturated; or if the pixel value is smaller than the predetermined value, it is determined that this pixel value is unsaturated. Although this "predetermined value" is not limited to a specific value, the following description assumes that the maximum value of a sensor analog value is used for the sake of convenience.

In step S605, the demosaic unit 109 operates the first interpolation unit 502, so the first interpolation unit 502 performs interpolation processing (to be described later) to obtain the DG value=DG(i,j) of the pixel at the pixel position (i,j). Processing performed by the first interpolation unit 502 in this step will be described in detail later.

In step S606, the demosaic unit 109 operates the second interpolation unit 503, so the second interpolation unit 503 performs the same operation as that of the demosaic unit 109, having been described in the first embodiment, to obtain the DG value=DG(i,j) of the pixel at the pixel position (i,j).

In step S607, the demosaic unit 109 determines whether the value of the variable i is equal to pel−1. If it is determined in step S607 that i=pel−1, the process advances to step S608; or if it is determined in step S607 that i≠pel−1, the value of the variable i is incremented by one and the processes in step S603 and subsequent steps are repeated.

In step S608, the demosaic unit 109 determines whether the value of the variable j is larger than line−1. If it is determined in step S608 that j>line−1, the process advances to step S609. On the other hand, if it is determined in step S608 that j≦line−1, the value of the variable i is initialized to zero, the value of the variable j is incremented by one, and the processes in step S603 and subsequent steps are repeated.

In step S609, the demosaic unit 109 initializes both the variables i and j to zero. In step S610, the demosaic unit 109 determines using the map information whether the solid-state image sensing element at the position on the image sensor 103, which corresponds to the pixel position (i,j) in the color image, is the solid-state image sensing element DR or DB. This determination is done in the same way as in step S303 mentioned above.

If it is determined in step S610 that the solid-state image sensing element corresponding to the pixel position (i,j) is the solid-state image sensing element DR or DB, the process advances to step S611; otherwise, the process advances to step S614.

In step S611, the demosaic unit 109 determines whether the pixel value of the pixel at the pixel position (i−1,j) or (i+1,j) in the color image is saturated. If it is determined in step S611 that this pixel value is saturated, the process advances to step S612; otherwise, the process advances to step S613.

In step S612, the demosaic unit 109 operates the first interpolation unit 502, so the first interpolation unit 502 performs interpolation processing (to be described later) to obtain the DG value=DG(i,j) of the pixel at the pixel position (i,j). Processing performed by the first interpolation unit 502 in this step will be described in detail later.

In step S613, the demosaic unit 109 operates the second interpolation unit 503, so the second interpolation unit 503 performs the same operation as that of the demosaic unit 109, having been described in the first embodiment, to obtain the DG value=DG(i,j) of the pixel at the pixel position (i,j).

In step S614, the demosaic unit 109 determines using the map information whether the solid-state image sensing element at the position on the image sensor 103, which corresponds to the pixel position (i,j) in the color image, is the solid-state image sensing element LR or LB. This determination is done in the same way as in step S303 mentioned above.

If it is determined in step S614 that the solid-state image sensing element corresponding to the pixel position (i,j) is the solid-state image sensing element LR or LB, the process advances to step S615; otherwise, the process advances to step S618.

In step S615, the demosaic unit 109 determines whether the pixel value of the pixel at the pixel position (i−1,j−1), (i−1,j+1), (i+1,j−1), or (i+1,j+1) in the color image is saturated. If it is determined in step S615 that this pixel value is saturated, the process advances to step S616; otherwise, the process advances to step S617.

In step S616, the demosaic unit 109 operates the first interpolation unit 502, so the first interpolation unit 502 performs interpolation processing (to be described later) to obtain the DG value=DG(i,j) of the pixel at the pixel position (i,j). Processing performed by the first interpolation unit 502 in this step will be described in detail later.

In step S617, the demosaic unit 109 operates the second interpolation unit 503, so the second interpolation unit 503 performs the same operation as that of the demosaic unit 109, having been described in the first embodiment, to obtain the DG value=DG(i,j) of the pixel at the pixel position (i,j).

In step S618, the demosaic unit 109 determines whether the value of the variable i is equal to pel−1. If it is determined in step S618 that i=pel−1, the process advances to step S619; or if it is determined in step S618 that i≠pel−1, the value of the variable i is incremented by one and the processes in step S610 and subsequent steps are repeated.

In step S619, the demosaic unit 109 determines whether the value of the variable j is larger than line−1. If it is determined in step S619 that j>line−1, the process ends. On the other hand, if it is determined in step S619 that j≦line−1, the value of the variable i is initialized to zero, the value of the variable j is incremented by one, and the processes in step S610 and subsequent steps are repeated.

Figure 7:
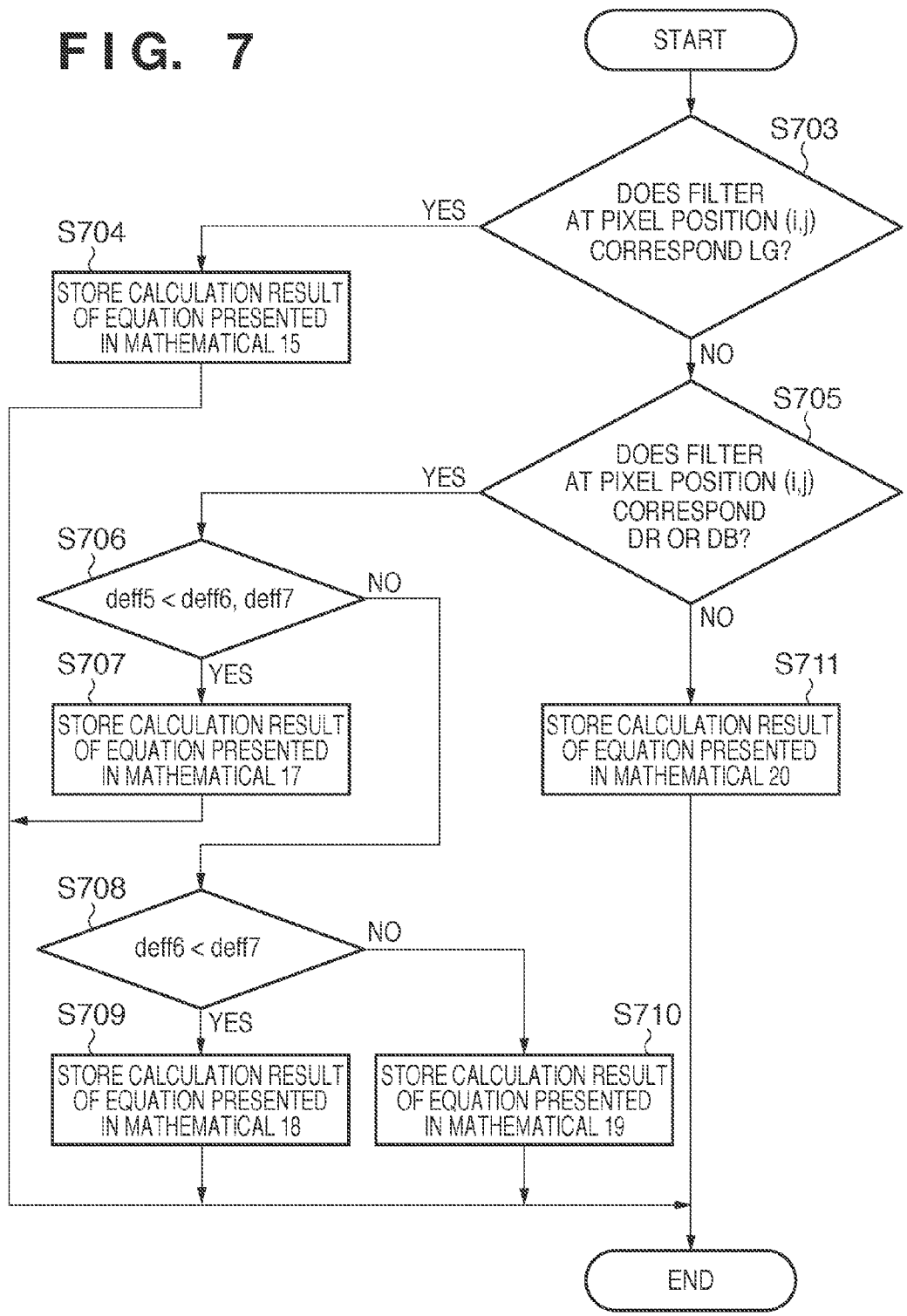
FIG. 7 is a flowchart of processing performed by a first interpolation unit 502.

Processing performed by the first interpolation unit 502 will be described with reference to FIG. 7 showing a flowchart of this processing. In step S703, the first interpolation unit 502 determines using the map information whether the solid-state image sensing element at the position on the image sensor 103, which corresponds to the pixel position (i,j) in the color image, is the solid-state image sensing element LG. This determination is done in the same way as in step S303 mentioned above.

If it is determined in step S703 that the solid-state image sensing element corresponding to the pixel position (i,j) is the solid-state image sensing element LG, the process advances to step S704; otherwise, the process advances to step S705. In step S704, the first interpolation unit 502 calculates an equation presented in mathematical 15 to determine DG(i,j).

$$DG(i,j)=\alpha \times LG(i,j) \qquad \text{[Mathematical 15]}$$

where α is a constant (0<α≦1) which represents the gain and is set in advance.

In step S705, the first interpolation unit 502 determines using the map information whether the solid-state image sensing element at the position on the image sensor 103, which corresponds to the pixel position (i,j) in the color image, is the solid-state image sensing element DR or DB. This determination is done in the same way as in step S303 mentioned above.

If it is determined in step S705 that the solid-state image sensing element corresponding to the pixel position (i,j) is the solid-state image sensing element DR or DB, the process advances to step S706; otherwise, the process ends. In step S706, the first interpolation unit 502 calculates equations presented in mathematical 16. This calculation yields an evaluation value deff5−1, variation evaluation value deff6−1, and evaluation value deff7−1. The evaluation value deff5−1 is an evaluation value for pixels adjacent to the pixel position (i,j) on the upper left and lower right sides. The variation evaluation value deff6−1 is a variation evaluation value for pixels adjacent to the pixel position (i,j) on the right and left sides. The evaluation value deff7−1 is an evaluation value for pixels adjacent to the pixel position (i,j) on the lower left and upper right sides. Note that if the calculation result of each evaluation value shows that the pixel value of one of the pair of upper left and lower right pixels is saturated, an evaluation value deff5−2 is obtained in place of the evaluation value deff5−1. Also, if the pixel value of one of the pair of right and left pixels is saturated, an evaluation value deff6−2 is obtained in place of the evaluation value deff6−1. Moreover, if the pixel value of one of the pair of lower left and upper right pixels is saturated, an evaluation value deff7−2 is obtained in place of the evaluation value deff7−1. Note that MAX is the difference between the minimum and maximum pixel values, and is 255 for a pixel value with 8 bits and 65535 for a pixel value with 16 bits.

$$deff5-1=|P(i-1,j-1)-P(i+1,j+1)|$$

$$deff5-2=MAX$$

$$deff6-1=|P(i-1,j)-P(i+1,j)|$$

$$deff6-2=MAX$$

$$deff7-1=|P(i-1,j+1)-P(i+1,j-1)|$$

$$deff7-2=MAX \qquad \text{[Mathematical 16]}$$

In the following description, the obtained one of deff5−1 and deff5−2 will be represented as deff5. Similarly, the obtained one of deff6−1 and deff6−2 will be represented as deff6. Again similarly, the obtained one of deff7−1 and deff7−2 will be represented as deff7. In step S706, the first interpolation unit 502 compares the evaluation values deff5, deff6, and deff7. If the comparison result shows that both conditions: deff5<deff6 and deff5<deff7 are satisfied, the process advances to step S707; otherwise, the process advances to step S708.

In step S707, the first interpolation unit 502 performs interpolation calculation using the pixel values of pixels adjacent to the pixel position (i,j) on the upper left and lower right sides to obtain DG(i,j) of the pixel at the pixel position (i,j) in accordance with an equation presented in mathematical 17.

$$DG(i,j)=(P(i-1,j-1)+P(i+1,j+1))\div 2 \qquad \text{[Mathematical 17]}$$

In step S708, the first interpolation unit 502 compares the evaluation values deff6 and deff7. If the comparison result shows deff6<deff7, the process advances to step S709; or if this comparison result shows deff6≧deff7, the process advances to step S710.

In step S709, the first interpolation unit 502 performs interpolation calculation using the pixel values of pixels adjacent to the pixel position (i,j) on the right and left sides to obtain DG(i,j) of the pixel at the pixel position (i,j) in accordance with an equation presented in mathematical 18.

$$DG(i,j)=(P(i-1,j)+P(i+1,j))\div 2 \qquad \text{[Mathematical 18]}$$

In step S710, the first interpolation unit 502 performs interpolation calculation using the pixel values of pixels adjacent to the pixel position (i,j) on the lower left and upper right sides to obtain DG(i,j) of the pixel at the pixel position (i,j) in accordance with an equation presented in mathematical 19.

$$DG(i,j)=(P(i-1,j+1)+P(i+1,j-1))\div 2 \qquad \text{[Mathematical 19]}$$

In step S711, the first interpolation unit 502 performs interpolation calculation using the pixel values of pixels adjacent to the pixel position (i,j) on the right and left sides to obtain DG(i,j) of the pixel at the pixel position (i,j) in accordance with an equation presented in mathematical 20.

$$DG(i,j)=(P(i-1,j)+P(i+1,j))\div 2 \qquad \text{[Mathematical 20]}$$

In this manner, according to this embodiment, even when pixels with different sensitivities are arranged on the same sensor, the resolution of a portion incapable of being sampled can be partially restored by performing interpolation using the correlation between a color filter with a highest resolution and multiple colors.

Also, because pixel value determination which uses two pixels with different sensitivities is performed for an unsaturated pixel value, it is possible to obtain a higher resolution. Moreover, even if either pixel value is saturated, it is possible to perform pixel interpolation, which improves the resolution.

[Third Embodiment]

Another embodiment of the demosaic unit 109 according to the second embodiment will be described in the third embodiment. Note that in this embodiment, solid-state image sensing elements arranged on an image sensor 103 preferably have a layout distribution shown in FIG. 9. Also, only differences from the second embodiment will be mentioned below, and the third embodiment is the same as the first embodiment except for points to be described hereinafter.

Figure 8A:
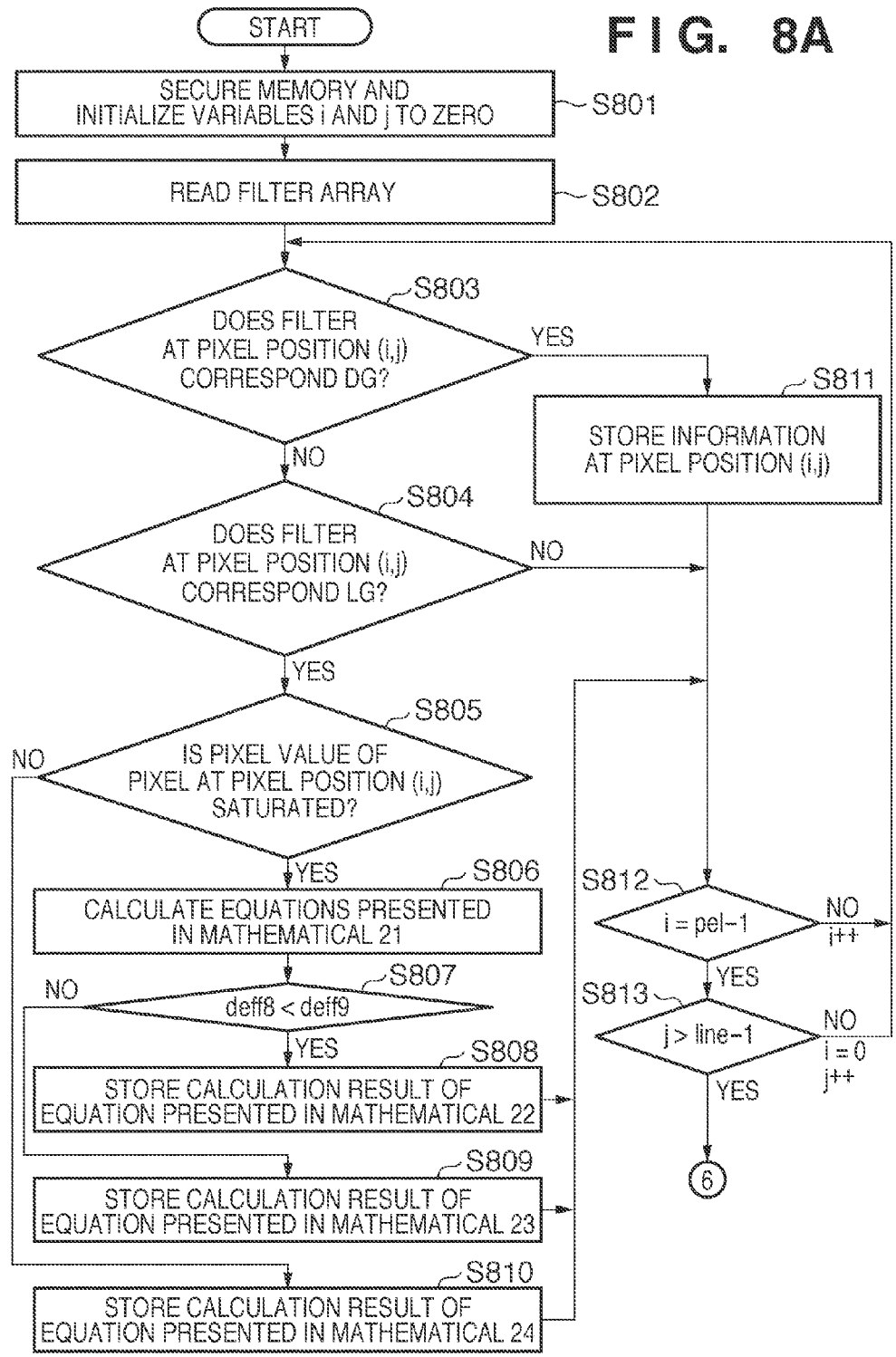
FIG. 8A is a flowchart of processing for obtaining the DG value of each pixel.
Figure 8B:
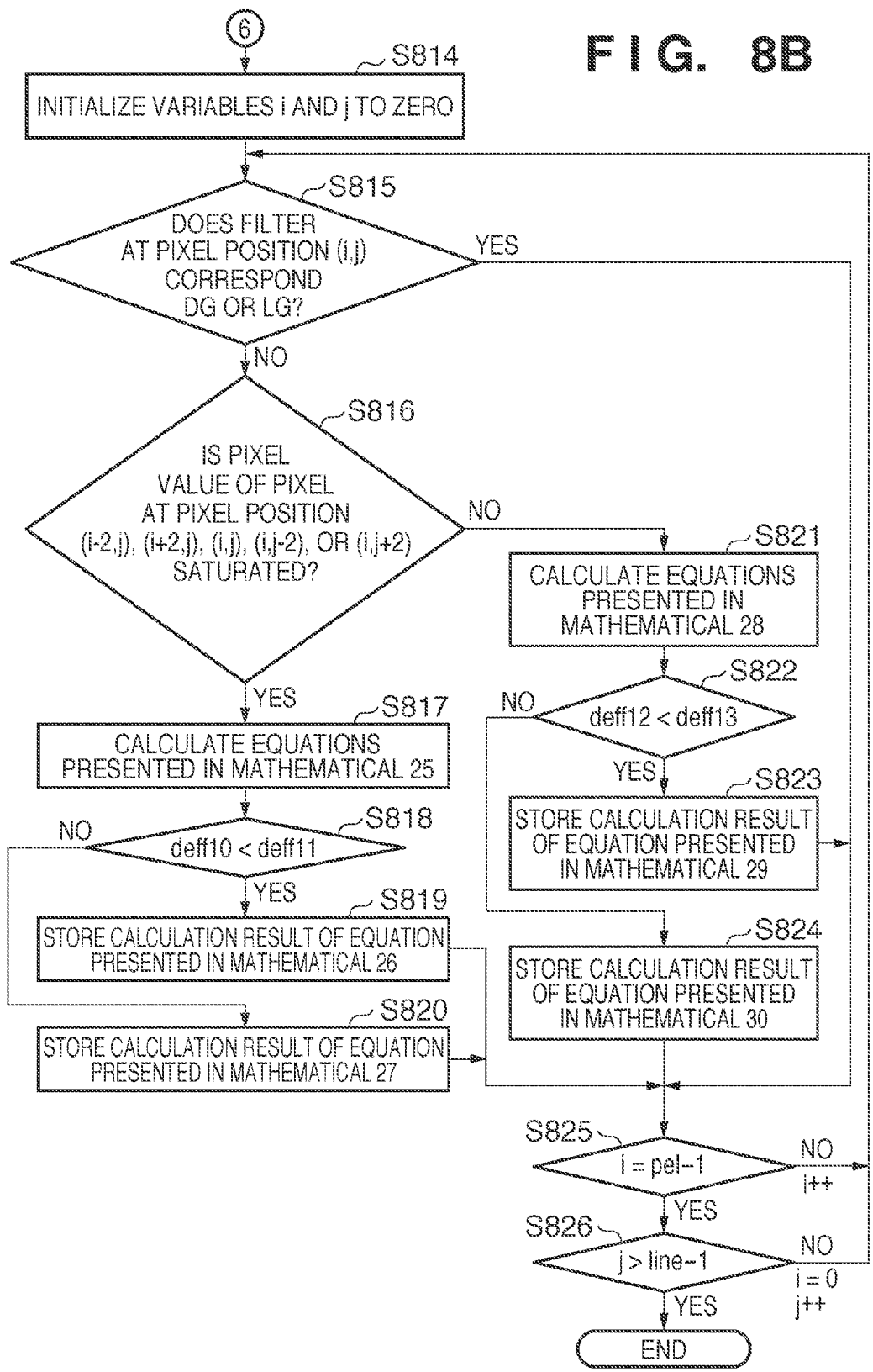
FIG. 8B is a flowchart of the processing for obtaining the DG value of each pixel.

Processing with which a demosaic unit 109 according to this embodiment obtains the DG value of each pixel which constitutes a color image will be described with reference to FIGS. 8A and 8B showing flowcharts of this processing. Note that the following description assumes that a pixel value P(i,j) is stored in advance for DG(i,j).

In step S801, the demosaic unit 109 secures a memory area, used to perform processing to be described later, in a memory which is provided in itself or managed by it, and initializes both the variables i and j indicating the pixel position in the above-mentioned color image to zero.

In step S802, the demosaic unit 109 reads out, from the above-mentioned memory, map information (filter array) indicating which of solid-state image sensing elements DR, DG, DB, LR, LG, and LB is placed at each position on the image sensor 103, as shown in FIG. 9.

In step S803, the demosaic unit 109 determines using the map information whether the solid-state image sensing element at the position on the image sensor 103, which corresponds to the pixel position (i,j) in the color image, is the solid-state image sensing element DG. This determination is done in the same way as in step S303 mentioned above.

If it is determined in step S803 that the solid-state image sensing element corresponding to the pixel position (i,j) is not the solid-state image sensing element DG, the process advances to step S804; otherwise, the process advances to step S811.

In step S804, the demosaic unit 109 determines using the map information whether the solid-state image sensing element at the position on the image sensor 103, which corresponds to the pixel position (i,j) in the color image, is the solid-state image sensing element LG. This determination is done in the same way as in step S303 mentioned above.

If it is determined in step S804 that the solid-state image sensing element corresponding to the pixel position (i,j) is not the solid-state image sensing element LG, the process advances to step S812; otherwise, the process advances to step S805.

In step S805, the demosaic unit 109 determines whether the pixel value of the pixel at the pixel position (i,j) in the color image is saturated. If it is determined in step S805 that this pixel value is saturated, the process advances to step S806; otherwise, the process advances to step S810.

In step S806, a first interpolation unit 502 calculates equations presented in mathematical 21. This calculation yields an evaluation value deff8 for pixels adjacent to the pixel position (i,j) on the upper left and lower right sides, and a variation evaluation value deff9 for pixels adjacent to the pixel position (i,j) on the lower left and upper right sides.

$$deff8=|P(i-1,j-1)-P(i+1,j+1)|$$

$$deff9=|P(i-1,j+1)-P(i+1,j-1)| \qquad \text{[Mathematical 21]}$$

In step S807, the evaluation values deff8 and deff9 are compared with each other. If deff8<deff9, the process advances to step S808; or if deff8≧deff9, the process advances to step S809.

In step S808, the first interpolation unit 502 performs interpolation calculation using an equation presented in mathematical 22. This yields DG(i,j) of the pixel at the pixel position (i,j).

$$DG(i,j)=(P(i-1,j-1)+P(i+1,j+1))\div 2 \qquad \text{[Mathematical 22]}$$

In step S809, the first interpolation unit 502 performs interpolation calculation using an equation presented in mathematical 23. This yields DG(i,j) of the pixel at the pixel position (i,j).

$$DG(i,j)=(P(i-1,j+1)+P(i+1,j-1))\div 2 \qquad \text{[Mathematical 23]}$$

In step S810, the first interpolation unit 502 performs interpolation calculation using an equation presented in mathematical 24. This yields DG(i,j) of the pixel at the pixel position (i,j).

$$DG(i,j)=\alpha \times P(i,j) \qquad \text{[Mathematical 24]}$$

In step S811, the demosaic unit 109 substitutes the pixel value P(i,j) for DG(i,j). In step S812, the demosaic unit 109 determines whether the value of the variable i is equal to pel−1. If it is determined in step S812 that i=pel−1, the process advances to step S813; or if it is determined in step S812 that i≠pel−1, the value of the variable i is incremented by one and the processes in step S803 and subsequent steps are repeated.

In step S813, the demosaic unit 109 determines whether the value of the variable j is larger than line−1. If it is determined in step S813 that j>line−1, the process advances to step S814. On the other hand, if it is determined in step S813 that j≦line−1, the value of the variable i is initialized to zero, the value of the variable j is incremented by one, and the processes in step S803 and subsequent steps are repeated.

In step S814, the demosaic unit 109 initializes both the variables i and j to zero. In step S815, the demosaic unit 109 determines whether the pixel position (i,j) corresponds to DG or LG. If it is determined that the pixel position (i,j) corresponds to DG or LG, the process advances to step S825; otherwise, the process advances to step S816.

In step S816, the demosaic unit 109 determines whether the solid-state image sensing element at the position on the image sensor 103, which corresponds to the pixel position (i−2,j), (i+2,j), (i,j), (i,j−2), or (i,j+2), is saturated. This determination is done in the same way as in step S805. If it is determined in step S816 that this solid-state image sensing element is saturated, the process advances to step S817; otherwise, the process advances to step S821.

In step S817, the first interpolation unit 502 calculates equations presented in mathematical 25. This calculation yields an evaluation value deff10 for pixels adjacent to the pixel position (i,j) on the upper and lower sides, and a variation evaluation value deff11 for pixels adjacent to the pixel position (i,j) on the right and left sides.

$$deff10=|P(i,j-1)-P(i,j+1)|$$

$$deff11=|P(i-1,j)-P(i+1,j)| \qquad \text{[Mathematical 25]}$$

In step S818, the demosaic unit 109 compares the evaluation values deff10 and deff11. If the comparison result shows deff10<deff11, the process advances to step S819; or if this comparison result shows deff10≧deff11, the process advances to step S820.

In step S819, the first interpolation unit 502 performs interpolation calculation using an equation presented in mathematical 26. This yields DG(i,j) of the pixel at the pixel position (i,j).

$$DG(i,j)=(P(i,j-1)+P(i,j+1))\div 2 \qquad \text{[Mathematical 26]}$$

In step S820, the first interpolation unit 502 performs interpolation calculation using an equation presented in mathematical 27. This yields DG(i,j) of the pixel at the pixel position (i,j).

$$DG(i,j)=(P(i-1,j)+P(i+1,j))\div 2 \qquad \text{[Mathematical 27]}$$

In step S821, a second interpolation unit 503 calculates equations presented in mathematical 28. This calculation yields an evaluation value deff12 for pixels which are adjacent to the pixel position (i,j) vertically, and a variation evaluation value deff13 for pixels which are adjacent to the pixel position (i,j) horizontally.

$$deff12=|2\times(P(i,j)-P(i,j-2)-P(i,j+2))|+|P(i,j-1)-P(i,j+1)|$$

$$deff13=|2\times(P(i,j)-P(i-2,j)-P(i+2,j))|+|P(i-1,j)-P(i+1,j)| \qquad \text{[Mathematical 28]}$$

In step S822, the demosaic unit 109 compares the evaluation values deff12 and deff13. If the comparison result shows deff12<deff13, the process advances to step S823; or if this comparison result shows deff12≧deff13, the process advances to step S824.

In step S823, the second interpolation unit 503 performs interpolation calculation using an equation presented in mathematical 29. This yields DG(i,j) of the pixel at the pixel position (i,j).

$$DG(i,j)=|2\times(P(i,j)-P(i,j-2)-P(i,j+2))|\div 4+(P(i,j-1)+P(i,j+1))\div 2 \qquad \text{[Mathematical 29]}$$

In step S824, the second interpolation unit 503 performs interpolation calculation using an equation presented in mathematical 30. This yields DG(i,j) of the pixel at the pixel position (i,j).

$$DG(i,j)=|2\times(P(i,j)-P(i-2,j)-P(i+2,j))|\div 4+(P(i-1,j)+P(i+1,j))\div 2 \qquad \text{[Mathematical 30]}$$

In step S825, the demosaic unit 109 determines whether the value of the variable i is equal to pel−1. If it is determined in step S825 that i=pel−1, the process advances to step S826; or if it is determined in step S825 that i≠pel−1, the value of the variable i is incremented by one and the processes in step S815 and subsequent steps are repeated.

In step S826, the demosaic unit 109 determines whether the value of the variable j is larger than line−1. If it is determined in step S826 that j>line−1, the process ends. On the other hand, if it is determined in step S826 that j≦line−1, the value of the variable i is initialized to zero, the value of the variable j is incremented by one, and the processes in step S815 and subsequent steps are repeated.

Figure 10A:
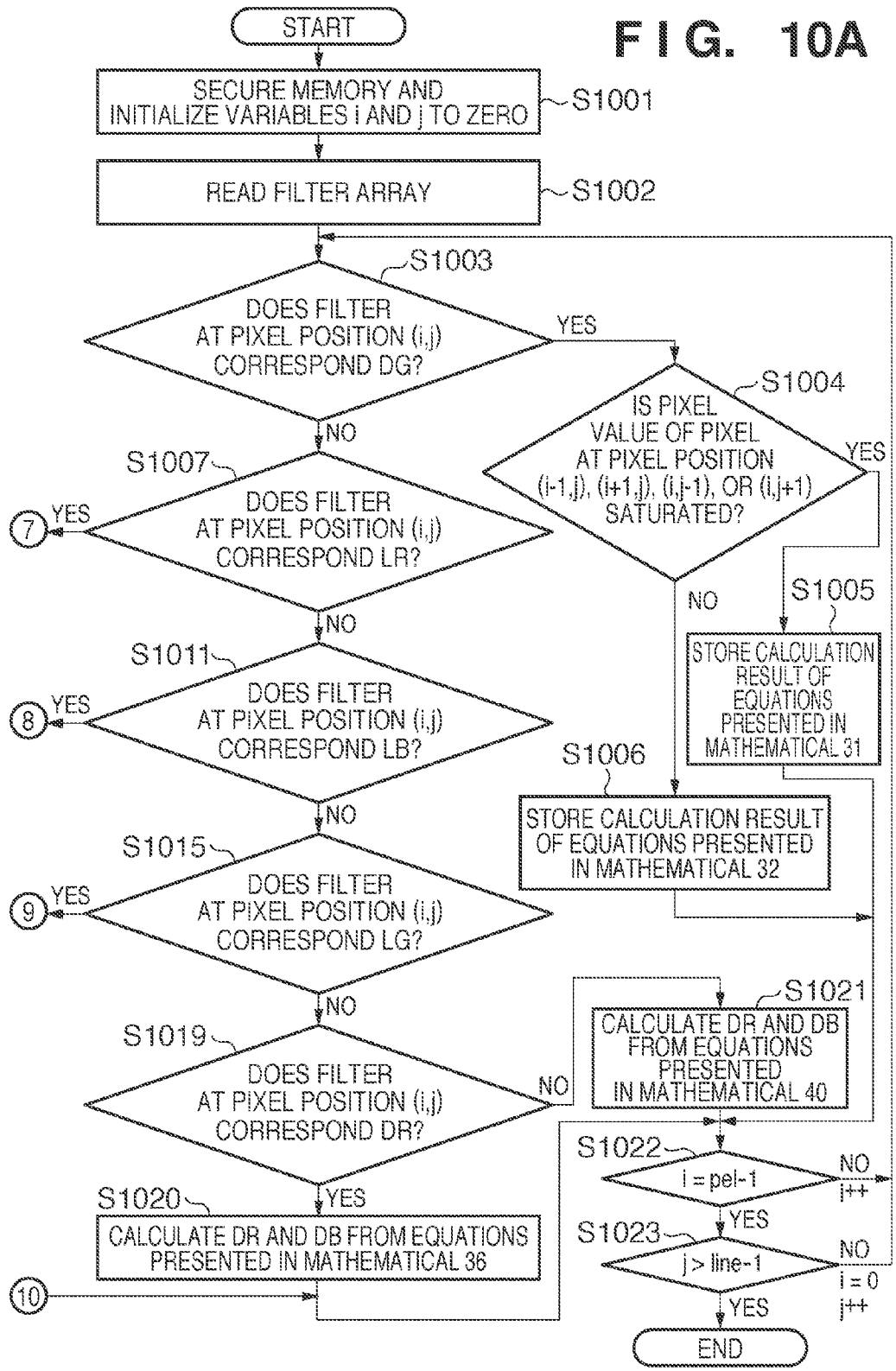
FIG. 10A is a flowchart of processing for obtaining the DR and DB values of each pixel which constitutes a color image.
Figure 10B:
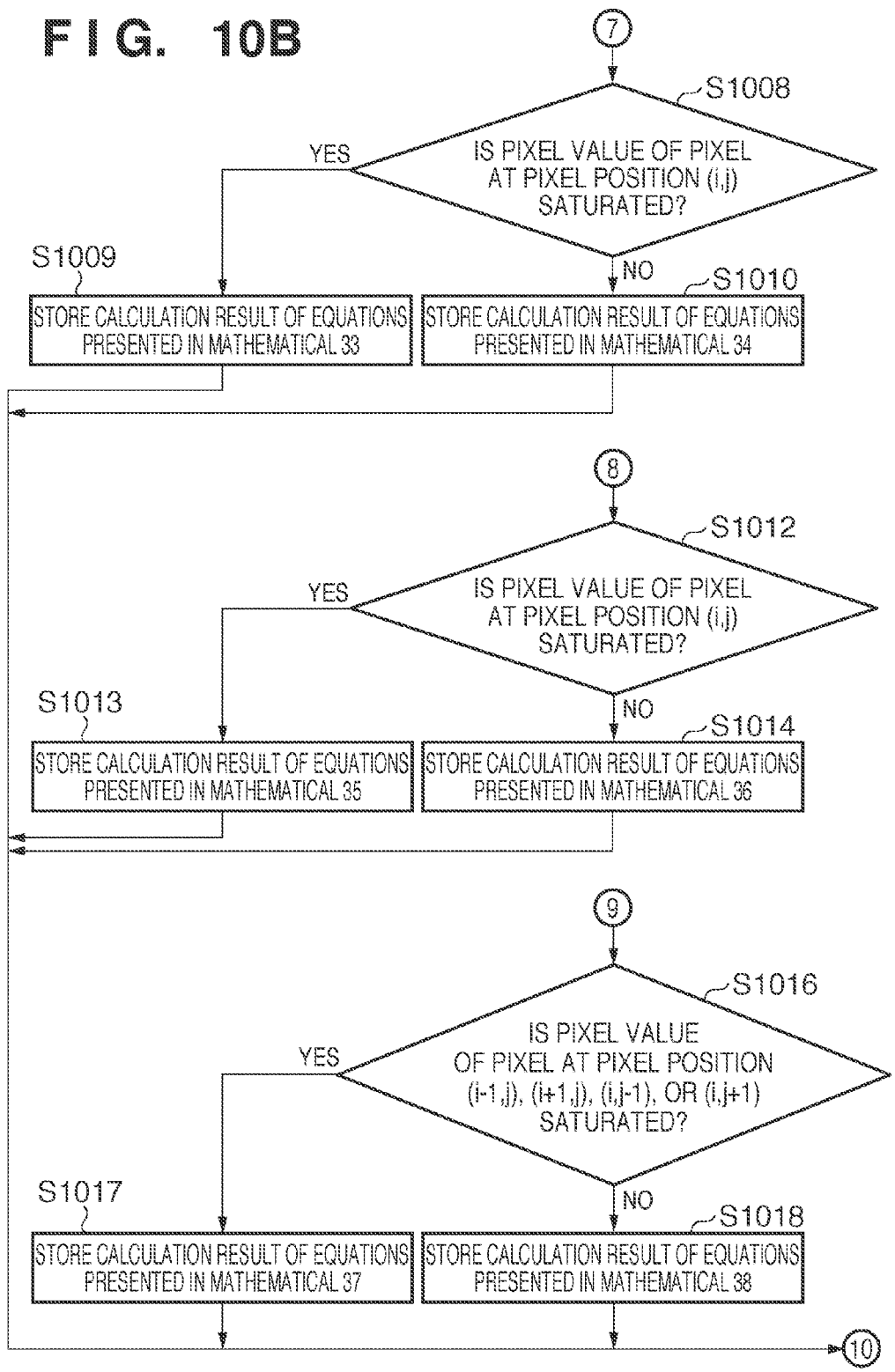
FIG. 10B is a flowchart of the processing for obtaining the DR and DB values of each pixel which constitutes a color image.

Processing with which the demosaic unit 109 according to this embodiment obtains the DR and DB values of each pixel which constitutes a color image will be described with reference to FIGS. 10A and 10B showing flowcharts of this processing.

In step S1001, the demosaic unit 109 secures a memory area, used to perform processing to be described later, in a memory which is provided in itself or managed by it, and initializes both the variables i and j indicating the pixel position in the above-mentioned color image to zero.

In step S1002, the demosaic unit 109 reads out, from the above-mentioned memory, map information (filter array) indicating which of solid-state image sensing elements DR, DG, DB, LR, LG, and LB is placed at each position on the image sensor 103, as shown in FIG. 9.

In step S1003, the demosaic unit 109 determines using the map information whether the solid-state image sensing element at the position on the image sensor 103, which corresponds to the pixel position (i,j) in the color image, is the solid-state image sensing element DG. This determination is done in the same way as in step S303 mentioned above. If it is determined that the pixel position (i,j) corresponds to DG, the process advances to step S1004; otherwise, the process advances to step S1007.

In step S1004, the demosaic unit 109 determines whether the pixel value of the pixel at the pixel position (i−1,j), (i+1,j), (i,j−1), or (i,j+1) in the color image is saturated. If it is determined in step S1004 that this pixel value is saturated, the process advances to step S1005; otherwise, the process advances to step S1006.

In step S1005, the first interpolation unit 502 performs interpolation calculation using equations presented in mathematical 31. This yields DR(i,j) and DB(i,j) of the pixel at the pixel position (i,j).

when P(i−1,j) corresponds to LB $$DR(i,j)=(DR(i,j-1)-DR(i,j-1))\div 2+(DR(i-2,j+1)-DG(i-2,j+1)+DR(i+2,j+1)-DG(i+2,j+1))\div 4$$

$$DB(i,j)=(DB(i+1,j)-DG(i+1,j))\div 2+(DB(i-1,j-2)-DG(i-1,j-2)+DB(i-1,j+2)-DG(i-1,j+2))\div 4$$

when P(i−1,j) corresponds to DB $$DR(i,j)=(DR(i,j+1)-DG(i,j+1))\div 2+(DR(i-2,j-1)-DG(i-2,j-1)+DR(i+2,j-1)-DG(i+2,j-1))\div 4$$

$$DB(i,j)=(DB(i-1,j)-DG(i-1,j))\div 2+(DB(i+1,j-2)-DG(i+1,j-2)+DB(i+1,j+2)-DG(i+1,j+2))\div 4 \qquad \text{[Mathematical 31]}$$

In step S1006, the second interpolation unit 503 performs interpolation calculation using equations presented in mathematical 32. This yields DR(i,j) and DB(i,j) of the pixel at the pixel position (i,j).

when P(i−1,j) corresponds to LB $$DR(i,j)=(LR(i,j-1)-DR(i,j+1))\div 2$$

$$DB(i,j)=(LB(i-1,j)-DB(i+1,j))\div 2$$

when P(i−1,j) corresponds to DB $$DR(i,j)=(DR(i,j-1)-LR(i,j+1))\div 2$$

$$DB(i,j)=(DB(i-1,j)-LB(i+1,j))\div 2 \qquad \text{[Mathematical 32]}$$

In step S1007, the demosaic unit 109 determines using the map information whether the solid-state image sensing element at the position on the image sensor 103, which corresponds to the pixel position (i,j) in the color image, is the solid-state image sensing element LR. This determination is done in the same way as in step S303 mentioned above. If it is determined that the pixel position (i,j) corresponds to LR, the process advances to step S1008; otherwise, the process advances to step S1011.

In step S1008, the demosaic unit 109 determines whether the pixel value of the pixel at the pixel position (i,j) in the color image is saturated. If it is determined in step S1008 that this pixel value is saturated, the process advances to step S1009; otherwise, the process advances to step S1010.

In step S1009, the first interpolation unit 502 performs interpolation calculation using equations presented in mathematical 33. This yields DR(i,j) and DB(i,j) of the pixel at the pixel position (i,j).

$$DR(i,j)=(DR(i-2,j)-DG(i-2,j))\div 4+(DR(i+2,j)-DG(i+2,j))\div 4+(DR(i,j-2)-DR(i,j-2))\div 4+(DR(i,j+2)-DG(i,j+2))\div 4$$

$$DB(i,j)=(DB(i-1,j-1)+DB(i+1,j+1))\div 2 \qquad \text{[Mathematical 33]}$$

In step S1010, the second interpolation unit 503 performs interpolation calculation using equations presented in mathematical 34. This yields DR(i,j) and DB(i,j) of the pixel at the pixel position (i,j).

$$DR(i,j)=P(i,j)\times\alpha$$

$$DB(i,j)=(DB(i-1,j-1)+DB(i+1,j+1))\div 2 \qquad \text{[Mathematical 34]}$$

In step S1011, the demosaic unit 109 determines using the map information whether the solid-state image sensing element at the position on the image sensor 103, which corresponds to the pixel position (i,j) in the color image, is the solid-state image sensing element LB. This determination is done in the same way as in step S303 mentioned above. If it is determined that the pixel position (i,j) corresponds to LB, the process advances to step S1012; otherwise, the process advances to step S1015.

In step S1012, the demosaic unit 109 determines whether the pixel value of the pixel at the pixel position (i,j) in the color image is saturated. If it is determined in step S1012 that this pixel value is saturated, the process advances to step S1013; otherwise, the process advances to step S1014.

In step S1013, the first interpolation unit 502 performs interpolation calculation using equations presented in mathematical 35. This yields DR(i,j) and DB(i,j) of the pixel at the pixel position (i,j).

$$DR(i,j)=(DR(i-1,j-1)+DR(i+1,j+1))\div 2$$

$$DB(i,j)=(DB(i-2,j)-DG(i-2,j))\div 4+(DB(i+2,j)-DG(i+2,j))\div 4+(DB(i,j-2)-DG(i,j-2))\div 4+(DB(i,j+2)-DG(i,j+2))\div 4 \quad \text{[Mathematical 35]}$$

In step S1014, the second interpolation unit 503 performs interpolation calculation using equations presented in mathematical 36. This yields DR(i,j) and DB(i,j) of the pixel at the pixel position (i,j).

$$DR(i,j)=(DR(i-1,j-1)+DR(i+1,j+1))\div 2$$

$$DB(i,j)=P(i,j)\times \alpha \quad \text{[Mathematical 36]}$$

In step S1015, the demosaic unit 109 determines using the map information whether the solid-state image sensing element at the position on the image sensor 103, which corresponds to the pixel position (i,j) in the color image, is the solid-state image sensing element LG. This determination is done in the same way as in step S303 mentioned above. If it is determined that the pixel position (i,j) corresponds to LG, the process advances to step S1016; otherwise, the process advances to step S1019.

In step S1016, the demosaic unit 109 determines whether the pixel value of the pixel at the pixel position (i−1,j), (i+1,j), (i,j−1), or (i,j+1) in the color image is saturated. If it is determined in step S1016 that this pixel value is saturated, the process advances to step S1017; otherwise, the process advances to step S1018.

In step S1017, the first interpolation unit 502 performs interpolation calculation using equations presented in mathematical 37. This yields DR(i,j) and DB(i,j) of the pixel at the pixel position (i,j).

when P(i−1,j) corresponds to LR $$DR(i,j)=(DR(i+1,j)-DG(i+1,j))\div 2+(DR(i-1,j-2)-DG(i-1,j-2)+DR(i-1,j+2)-DG(i-1,j+2))\div 4$$

$$DB(i,j)=(DB(i,j-1)-DR(i,j-1))\div 2+(DB(i-2,j+1)-DG(i-2,j+1)+DB(i+2,j+1)-DG(i+2,j+1))\div 4$$

when P(i−1,j) corresponds to DR $$DR(i,j)=(DR(i-1,j)-DG(i-1,j))\div 2+(DR(i+1,j-2)-DG(i+1,j-2)+DR(i+1,j+2)-DG(i+1,j+2))\div 4$$

$$DB(i,j)=(DB(i,j+1)-DG(i,j+1))\div 2+(DB(i-2,j-1)-DG(i-2,j-1)+DB(i+2,j-1)-DG(i+2,j-1))\div 4 \quad \text{[Mathematical 37]}$$

In step S1018, the second interpolation unit 503 performs interpolation calculation using equations presented in mathematical 38. This yields DR(i,j) and DB(i,j) of the pixel at the pixel position (i,j).

when P(i−1,j) corresponds to LR $$DR(i,j)=(LR(i,j-1)-DR(i,j+1))\div 2$$

$$DB(i,j)=(DB(i-1,j)-LB(i+1,j))\div 2$$

when P(i−1,j) corresponds to DR $$DR(i,j)=(DR(i,j-1)-LR(i,j+1))\div 2$$

$$DB(i,j)=(LB(i-1,j)-DB(i+1,j))\div 2 \quad \text{[Mathematical 38]}$$

In step S1019, the demosaic unit 109 determines using the map information whether the solid-state image sensing element at the position on the image sensor 103, which corresponds to the pixel position (i,j) in the color image, is the solid-state image sensing element DR. This determination is done in the same way as in step S303 mentioned above. If it is determined that the pixel position (i,j) corresponds to DR, the process advances to step S1020; otherwise, the process advances to step S1021.

In step S1020, the first interpolation unit 502 performs interpolation calculation using equations presented in mathematical 39. This yields DR(i,j) and DB(i,j) of the pixel at the pixel position (i,j).

$$DR(i,j)=P(i,j)$$

$$DB(i,j)=(DB(i-1,j+1)+DB(i-1,j+1))\div 2 \quad \text{[Mathematical 39]}$$

In step S1021, the first interpolation unit 502 performs interpolation calculation using equations presented in mathematical 40. This yields DR(i,j) and DB(i,j) of the pixel at the pixel position (i,j).

$$DR(i,j)=(DR(i-1,j+1)+DR(i-1,j+1))\div 2$$

$$DB(i,j)=P(i,j)$$

As has been described above, according to this embodiment, even when pixels with different sensitivities are arranged on the same sensor, the resolution of a portion incapable of being sampled can be partially restored by performing interpolation using the correlation between a color filter with a highest resolution and multiple colors.

Also, because pixel value determination which uses two pixels with different sensitivities is performed for an unsaturated pixel value, it is possible to obtain a higher resolution. Moreover, even if either pixel value is saturated, it is possible to perform pixel interpolation, which improves the resolution.

[Other Embodiments]

The present invention can also be practiced by executing the following processing. That is, software (program) which implements the functions of the above-described embodiments is supplied to a system or apparatus via a network or various kinds of storage media, and read out and executed by a computer (or, for example, a CPU or an MPU) of the system or apparatus.

The present invention is not limited to the above-described embodiments, and various changes and modifications can be made within the spirit and scope of the present invention. Therefore, to apprise the public of the scope of the present invention, the following claims are made.

The invention claimed is:

1. An image sensing apparatus including an image sensor on which solid-state image sensing elements which sense color components at a first sensitivity and solid-state image sensing elements which sense color components at a second sensitivity higher than the first sensitivity are alternately, two-dimensional arranged, comprising:

a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor; and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DG which sense G components at the first brightness, solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said first calculation unit obtains an R component, having the first brightness, of a pixel, sensed by the solid-state image sensing element DG, by performing interpolation calculation using an R component and a G component, both having the first brightness, of a pixel adjacent to the pixel sensed by the solid-state image sensing element DG, and obtains a B component, having the first brightness, of the pixel, sensed by the solid-state image sensing element DG, by performing interpolation calculation using a B component and a G component, both having the first brightness, of a pixel adjacent to the pixel sensed by the solid-state image sensing element DG, and said second calculation unit obtains an R component, having the second brightness, of the pixel, sensed by the solid-state image sensing element DG, by performing interpolation calculation using an R component and a G component, both having the second brightness, of a pixel adjacent to the pixel sensed by the solid-state image sensing element DG, and obtains a B component, having the second brightness, of the pixel, sensed by the solid-state image sensing element DG, by performing interpolation calculation using a B component and a G component, both having the second brightness, of a pixel adjacent to the pixel sensed by the solid-state image sensing element DG.

2. The image sensing apparatus according to claim 1, wherein on the image sensor, a column of solid-state image sensing elements formed from the solid-state image sensing elements DG and the solid-state image sensing elements LG is arranged for every other column, and a ratio between the numbers of solid-state image sensing elements DR, solid-state image sensing elements DG, and solid-state image sensing elements DB is 1:2:1, and a ratio between the numbers of solid-state image sensing elements LR, solid-state image sensing elements LG, and solid-state image sensing elements LB is 1:2:1.

3. An image sensing apparatus including an image sensor on which solid-state image sensing element which sense color components at a first sensitivity and solid-state image sensing elements which sense color components at a first sensitivity higher than the first sensitivity are alternately, two-dimensionally arranged, comprising:

a first calculation unit that obtains a color component of given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor, and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DR which sense G components at the first brightness, and solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said fist calculation unit obtains an R component, having the first brightness, of a pixel, sensed by the solid-state image sensing element LR, by performing interpolation calculation using an R component and a G component, both having the first brightness, of a pixel adjacent to the pixel sensed by the solid-state image sensing element LR, and obtains a B component, having the first brightness, of the pixel, sensed by the solid-state image sensing element LR, by performing interpolation calculation using a B component and a G component, both having the first brightness, of a pixel adjacent to the pixel sensed by the solid-state image sensing element LR, and said second calculation unit determines an R component, having the second brightness, of the pixel sensed by the solid-state image sensing element LR as a pixel value, in the color image, of the pixel sensed by the solid-state image sensing element DG, and obtains a B components, having the second brightness, of the pixel, sensed by the solid-state image sensing element LR, by performing interpolation calculation using a B component and a G component, both having the second brightness, of a pixel adjacent to the pixel sensed by the solid-state image sensing element LR.

4. An image sensing apparatus including an image sensor on which solid-state image sensing elements which sense color components at a first sensitivity and solid-state image sensing elements which sense color components at a second sensitivity higher than the first sensitivity are alternately, two-dimensionally arranged, comprising:

a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor; and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DG which sense G components at the first brightness, and solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said first calculation unit obtains an R component, having the first brightness, of a pixel, sensed by the solid-state image sensing element LB, by performing interpolation calculation using an R component and a G component, both having the first brightness, of a pixel adjacent to the pixel sensed by the solid-state image sensing element LB, and obtains a B component, having the first brightness, of the pixel, sensed by the solid-state image sensing element LB, by performing interpolation calculation using a B component and a G component, both having the first brightness, of a pixel adjacent to the pixel sensed by the solid-state image sensing element LB, and said second calculation unit obtains an R component, having the second brightness, of the pixel, sensed by the solid-state image sensing element LB, by performing interpolation calculation using an R component and a G component, both having the second brightness, of a pixel adjacent to the pixel sensed by the solid-state image sensing element LB, and determines a B component, having the second brightness, of the pixel sensed by the solid-state image sensing element LB as a pixel value, in the color image, of the pixel sensed by the solid-state image sensing element LB.

5. An image sensing apparatus including an image sensor on which solid-state image sensing elements which sense color components at a first sensitivity and solid-state image sensing elements which sense color components at a second sensitivity higher than the first sensitivity are alternately, two-dimensionally arranged, comprising:

a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor; and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DG which sense G components at the first brightness, and solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said first calculation unit obtains an R component, having the first brightness, of a pixel, sensed by the solid-state image sensing element LG, by performing interpolation calculation using an R component and a G component, both having the first brightness, of a pixel adjacent to the pixel sensed by the solid-state image sensing element LG, and obtains a B component, having the first brightness, of the pixel, sensed by the solid-state image sensing element LG, by performing interpolation calculation using a B component and a G component, both having the first brightness, of a pixel adjacent to the pixel sensed by the solid-state image sensing element LG, and said second calculation unit obtains an R component, having the second brightness, of the pixel, sensed by the solid-state image sensing element LG, by performing interpolation calculation using an R component and a G component, both having the second brightness, of a pixel adjacent to the pixel sensed by the solid-state image sensing element LG, and obtains a B component, having the second brightness, of the pixel, sensed by the solid-state image sensing element LG, by performing interpolation calculation using a B component and a G component, both having the second brightness, of a pixel adjacent to the pixel sensed by the solid-state image sensing element LG.

6. An image sensing apparatus including an image sensor on which solid-state image sensing elements which sense color components at a first sensitivity and solid-state image sensing elements which sense color components at a second sensitivity higher than the first sensitivity are alternately, two-dimensionally arranged, comprising:

a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor; and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DG which sense G components at the first brightness, and solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said first calculation unit determines an R component, having the first brightness, of a pixel sensed by the solid-state image sensing element DR as a pixel value, in the color image, of the pixel sensed by the solid-state image sensing element DR, and obtains a B component, having the first brightness, of the pixel, sensed by the solid-state image sensing element DR, by performing interpolation calculation using a B component and a G component, both having the first brightness, of a pixel adjacent to the pixel sensed by the solid-state image sensing element DR, and said second calculation unit obtains an R component, having the second brightness, of the pixel, sensed by the solid-state image sensing element DR, by performing interpolation calculation using an R component and a G component, both having the second brightness, of a pixel adjacent to the pixel sensed by the solid-state image sensing element DR, and determines a B component, having the second brightness, of the pixel sensed by the solid-state image sensing element DR as a pixel value, in the color image, of the pixel sensed by the solid-state image sensing element DR.

7. An image sensing apparatus including an image sensor on which solid-state image sensing elements which sense color components at a first sensitivity and solid-state image sensing elements which sense color components at a second sensitivity higher than the first sensitivity are alternately, two-dimensionally arranged, comprising:

a first calculation unit that obtains a color component of a given pixel, sensed at the first sensitivity, by performing interpolation calculation using color components of pixels each of which is adjacent to the given pixel and is sensed at the first sensitivity, in a color image based on an image signal output from the image sensor;

a second calculation unit that obtains a color component of a given pixel, sensed at the second sensitivity, by performing interpolation calculation using color components of pixels each of which is adjacent to the given pixel and is sensed at the second sensitivity, in the color image output from the image sensor; and a unit that outputs the color image in which color components of all pixels are determined by said first calculation unit and said second calculation unit, wherein the solid-state image sensing elements which sense the color components at the first sensitivity include solid-state image sensing elements DR which sense R components at a first brightness, solid-state image sensing elements DG which sense G components at the first brightness, and solid-state image sensing elements DB which sense B components at the first brightness, wherein the solid-state image sensing elements which sense the color components at the second sensitivity include solid-state image sensing elements LR which sense R components at a second brightness higher than the first brightness, solid-state image sensing elements LG which sense G components at the second brightness, and solid-state image sensing elements LB which sense B components at the second brightness, and wherein said first calculation unit obtains an R component, having the first brightness, of a pixel, sensed by the solid-state image sensing element DB, by performing interpolation calculation using an R component and a G component, both having the first brightness, of a pixel adjacent to the pixel sensed by the solid-state image sensing element DB, and determines a B component, having the first brightness, of the pixel sensed by the solid-state image sensing element DB as a pixel value, in the color image, of the pixel sensed by the solid-state image sensing element DB, and said second calculation unit obtains an R component, having the second brightness, of the pixel, sensed by the solid-state image sensing element DB, by performing interpolation calculation using an R component and a G component, both having the second brightness, of a pixel adjacent to the pixel sensed by the solid-state image sensing element DB, and obtains a B component, having the second brightness, of the pixel, sensed by the solid-state image sensing element DB, by performing interpolation calculation using a B component and a G component, both having the second brightness, of a pixel adjacent to the pixel sensed by the solid-state image sensing element DB.

* * * * *